United States Patent [19]

Fujino et al.

[11] 4,063,061
[45] Dec. 13, 1977

[54] BUTT-WELDING DEVICE

[75] Inventors: Yoshiharu Fujino, Yokohama; Iwane Chiba, Soka; Toshimi Chiyonobu, Fukuyama; Tomihisa Takahata, Fukuyama; Yasuhiko Kachi, Fukuyama, all of Japan

[73] Assignee: Ishikawayima-Harima Jukogyo Kabushiki Kaisha, Tokyo, Japan

[21] Appl. No.: 643,705

[22] Filed: Dec. 23, 1975

[30] Foreign Application Priority Data

May 23, 1975 Japan .................................. 50-61716

[51] Int. Cl.$^2$ ............................................. B23K 11/02
[52] U.S. Cl. ...................................... 219/101; 219/161
[58] Field of Search ................. 219/97, 100, 101, 104, 219/105, 158, 161; 228/5.7

[56] References Cited

U.S. PATENT DOCUMENTS

| 2,276,354 | 3/1942 | Trainer | 219/104 X |
|---|---|---|---|
| 3,403,833 | 10/1968 | Wheeler et al. | 228/5.7 |
| 3,618,844 | 11/1971 | Morley et al. | 228/5.7 |
| 3,941,972 | 3/1976 | Toma | 219/97 |

Primary Examiner—J. V. Truhe
Assistant Examiner—N. D. Herkamp
Attorney, Agent, or Firm—Scrivener, Parker, Scrivener & Clarke

[57] ABSTRACT

A butt welding device wherein the trailing edge of a first or preceding strip and the leading edge of a second or succeeding strip are clamped in position, simultaneously cut off, and joined together by flash butt welding and thereafter the flash and upset are removed by machining.

9 Claims, 35 Drawing Figures

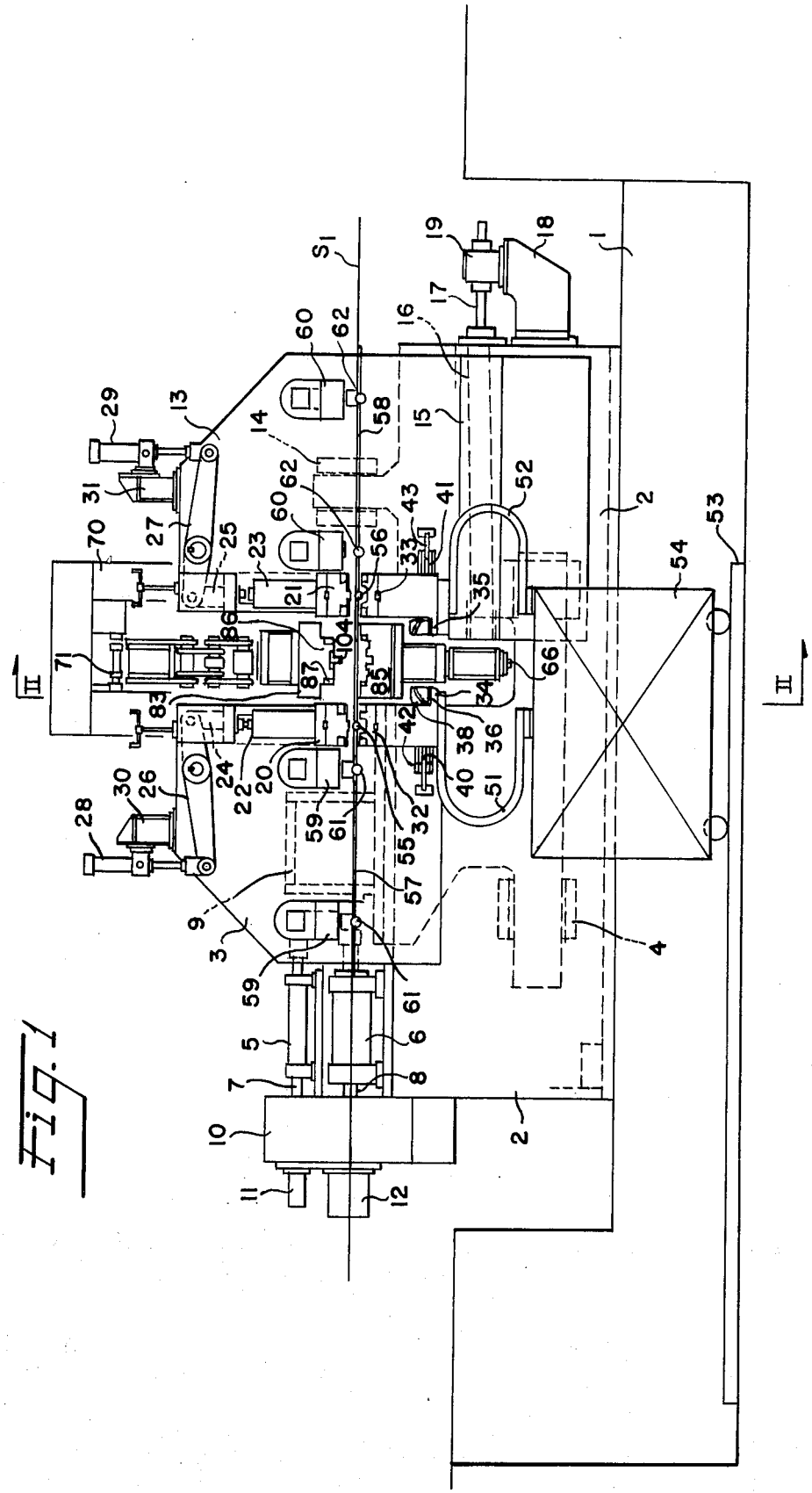

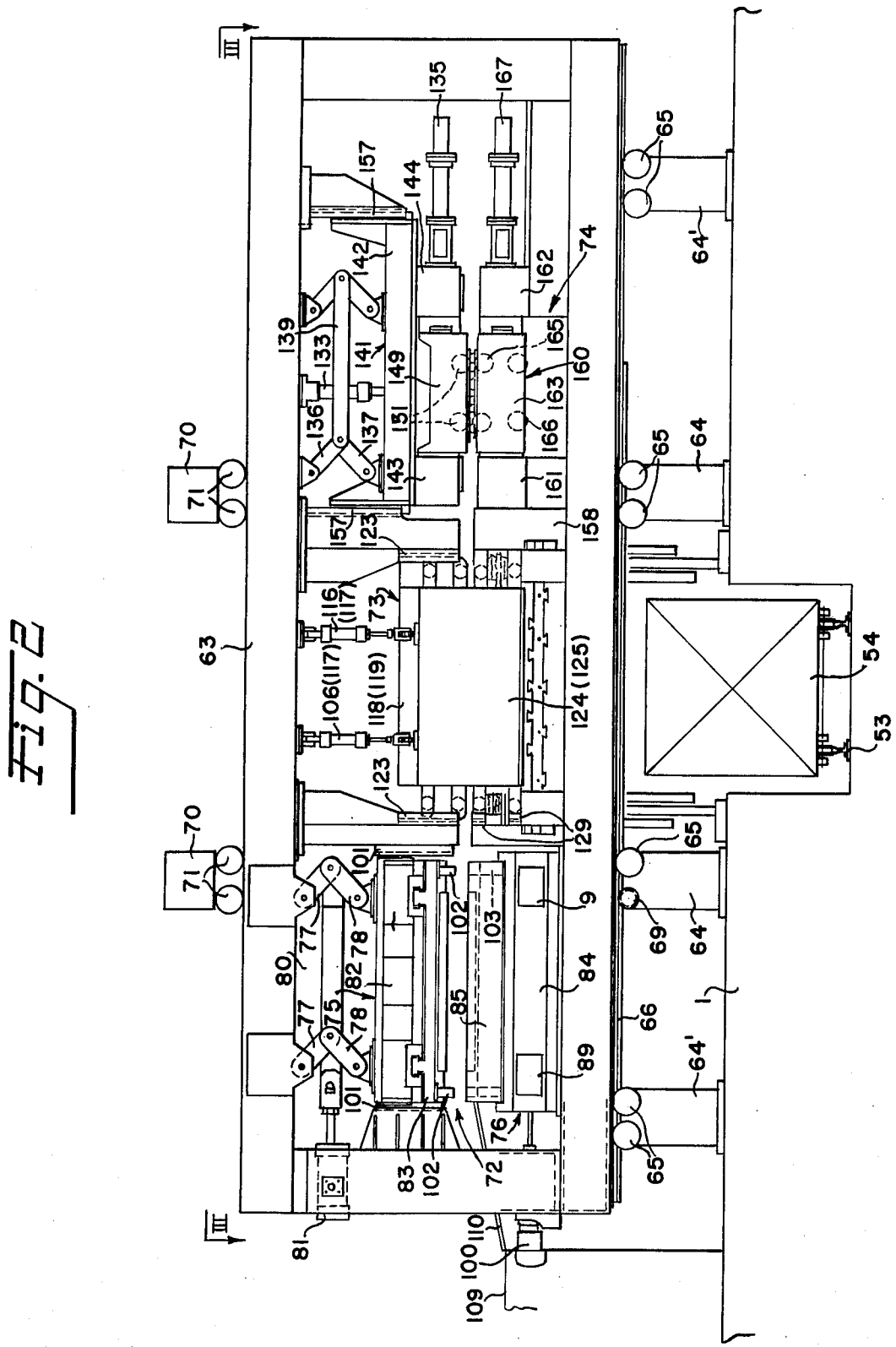

Fig. 5
(A)
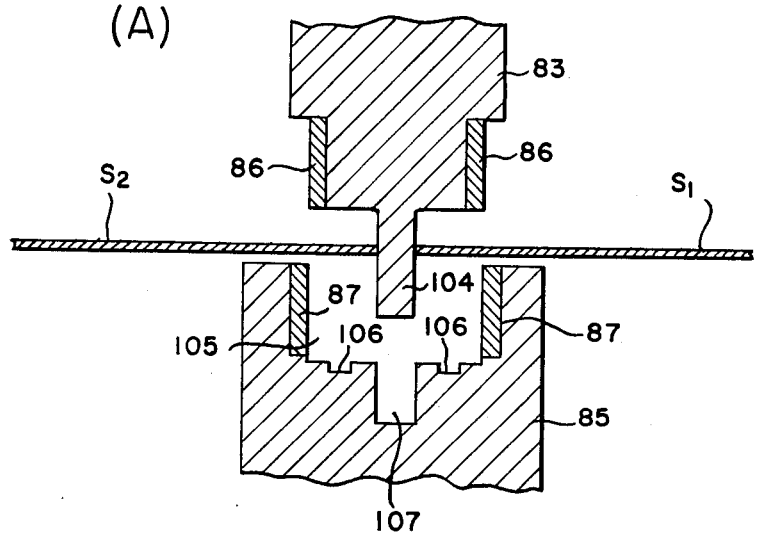
(B)
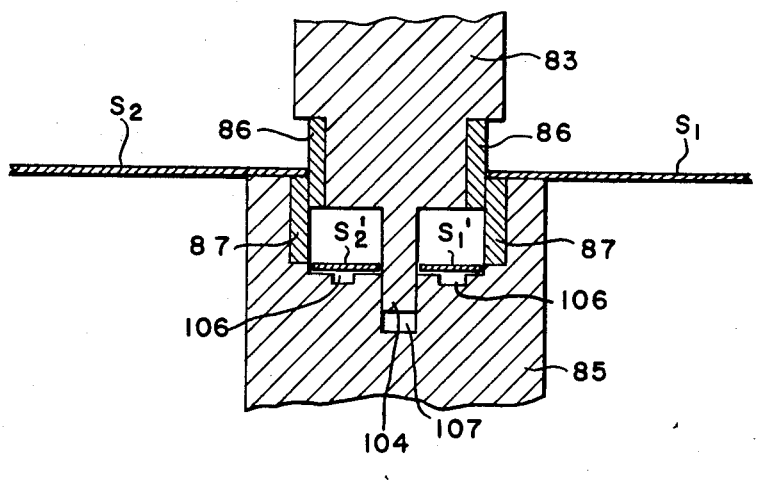

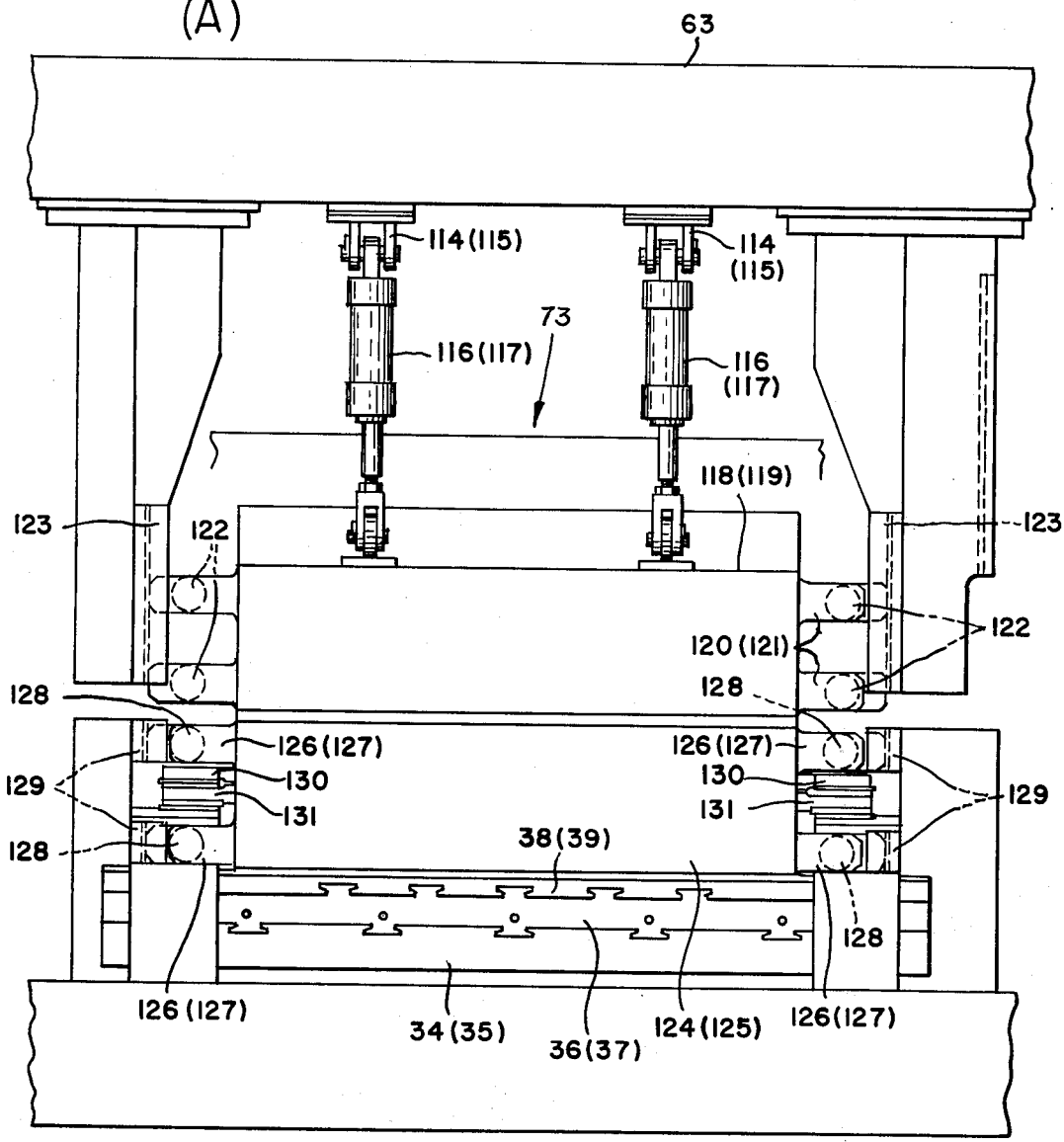
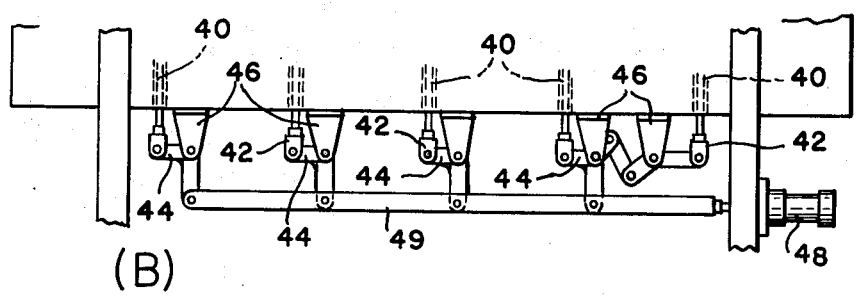

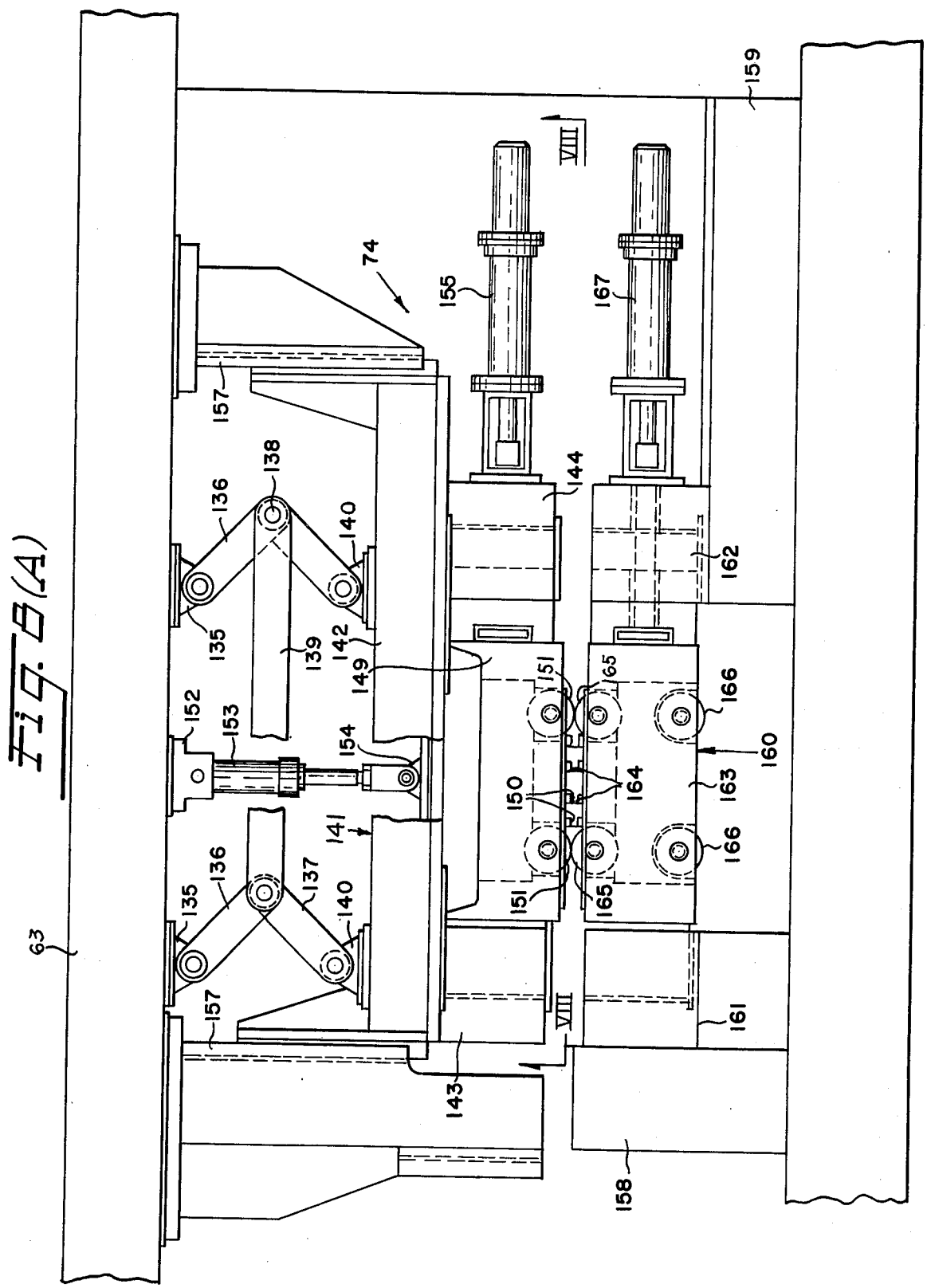

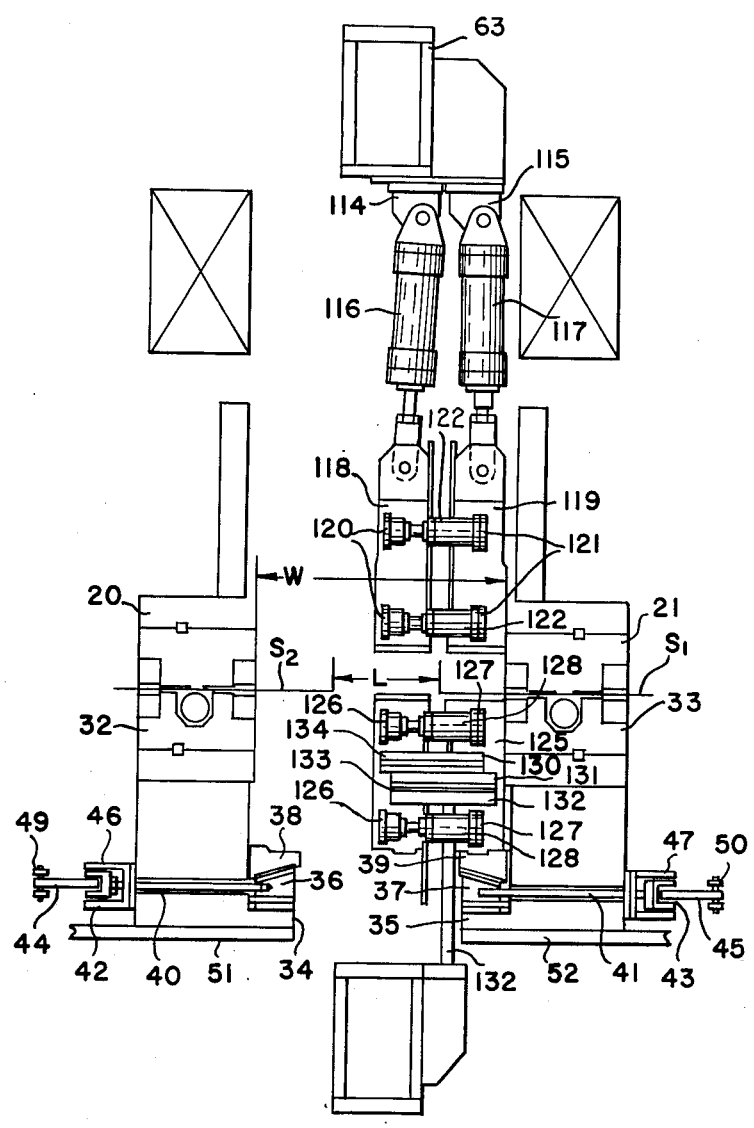

Fig.10
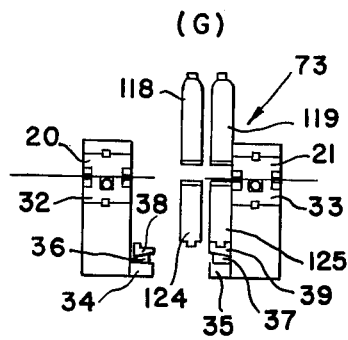
(G)
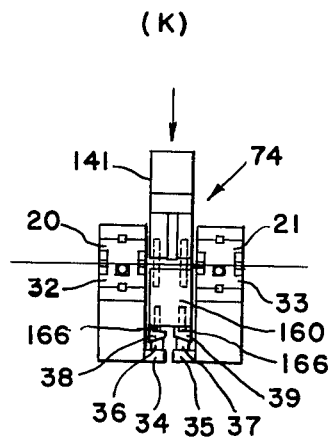
(K)
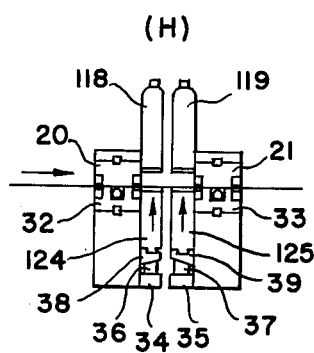
(H)
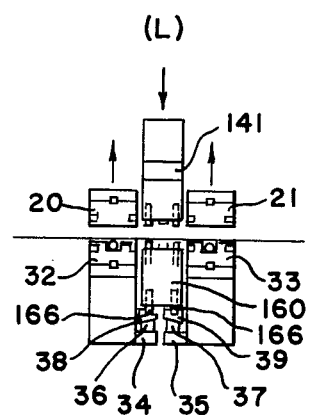
(L)
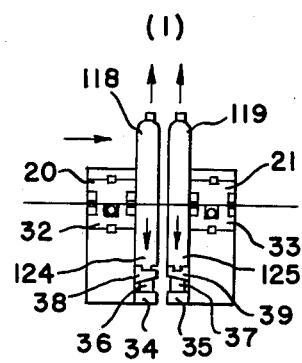
(I)
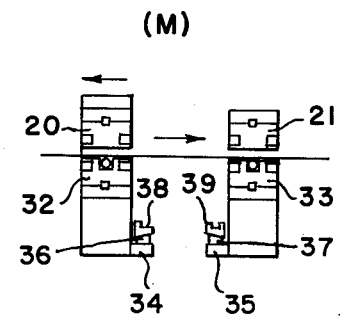
(M)
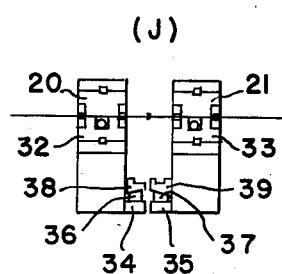
(J)

BUTT-WELDING DEVICE

DETAILED DESCRIPTION OF THE INVENTION

The present invention relates to a butt welding device for use in a strip mill line, pickling line, etc.

In the continuous production line of a strip mill are incorporated the stages accomplishing the essential steps such as pickling, rolling and so on so that it is essential to joint the trailing edge of a first or preceding strip with the leading edge of a second or succeeding strip in order to continuously pass the strip through the production line for various treatments. However in the conventional strip mills, both the trailing edge of the first strip and the leading edge of the second strip are cut outside of a welding machine incorporated in the continuous production line, and thereafter the prepared edges of the first and second strips are fed into the welding machine, clamped in position and then welded together. Therefore, there are some serious problems. Firstly, the first and second strips cannot be located and clamped in position with a desired degree of accuracy in the welding machine. In welding, the edges to be joined are clamped in position be electrodes, but the distance from the electrode and the edge of the strip must be changed depending upon the thickness of the strip by the use of a space bar. However, because of the construction and arrangement of the space bar, the distance cannot be adjusted in stepless manner of infinitesimally. Furthermore when the spacer bar strikes against the edge of the strip, its impact tends to cause the deformation of the edge, thus adversely affecting the weld joint. Since the spacer bar does not make intimate contact with the edge, the edges to be joined are not aligned in parallel with each other so that a reliable joint cannot be formed.

One of the objects of the present invention is therefore to provide a butt welding device in which the trailing edge of a first or preceeding strip and the leading edge of a second or succeeding strip area automatically cut out, and automatically welded together at a high speed, whereby a highly reliable and strong joint may be provided.

the present invention will become apparent from the following description of one preferred embodiment thereof taken in conjunction with the accompanying drawing, in which:

FIGS. 2 and 3 are side and top views, respectively, thereof:

Figure 6:
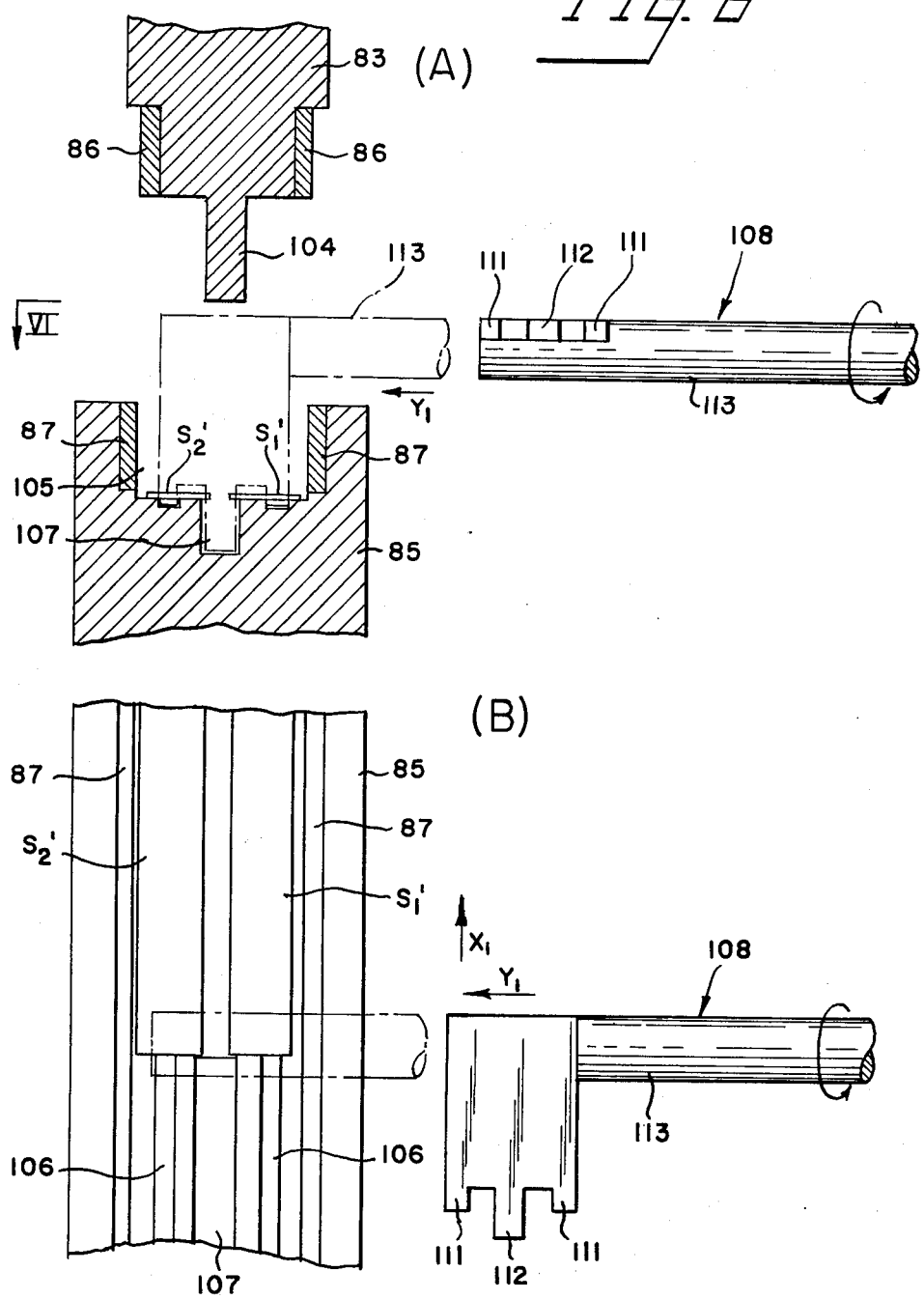
Figure 8:
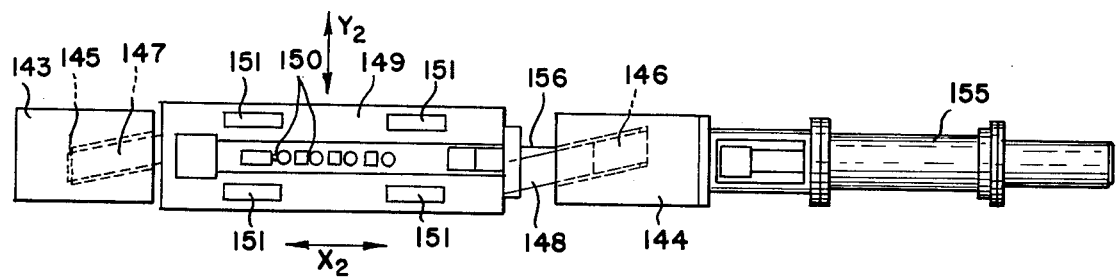
Figure 9:
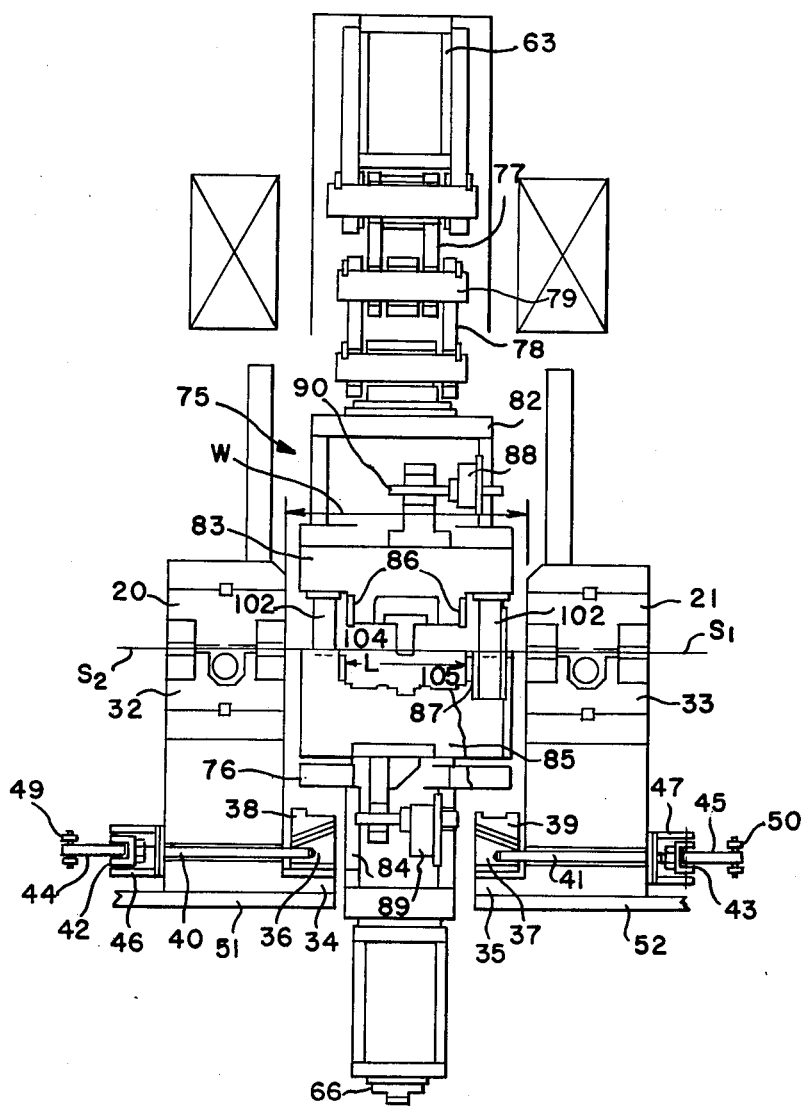
Figure 9:
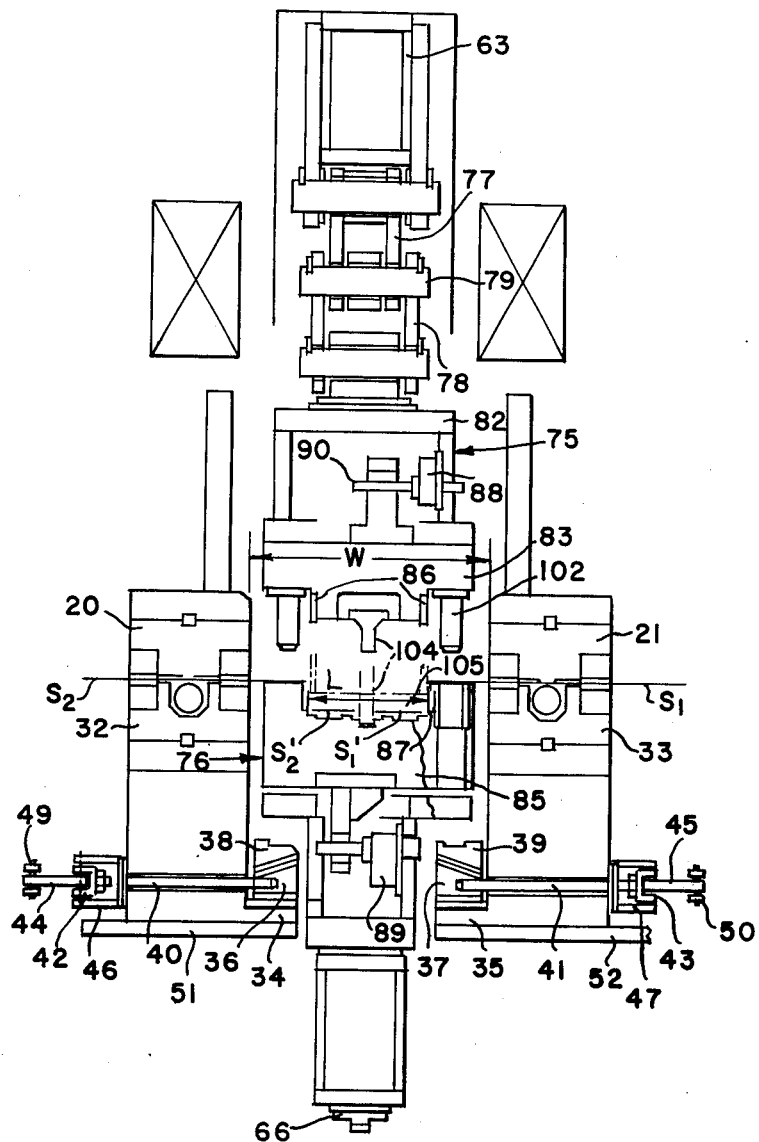
Figure 9:
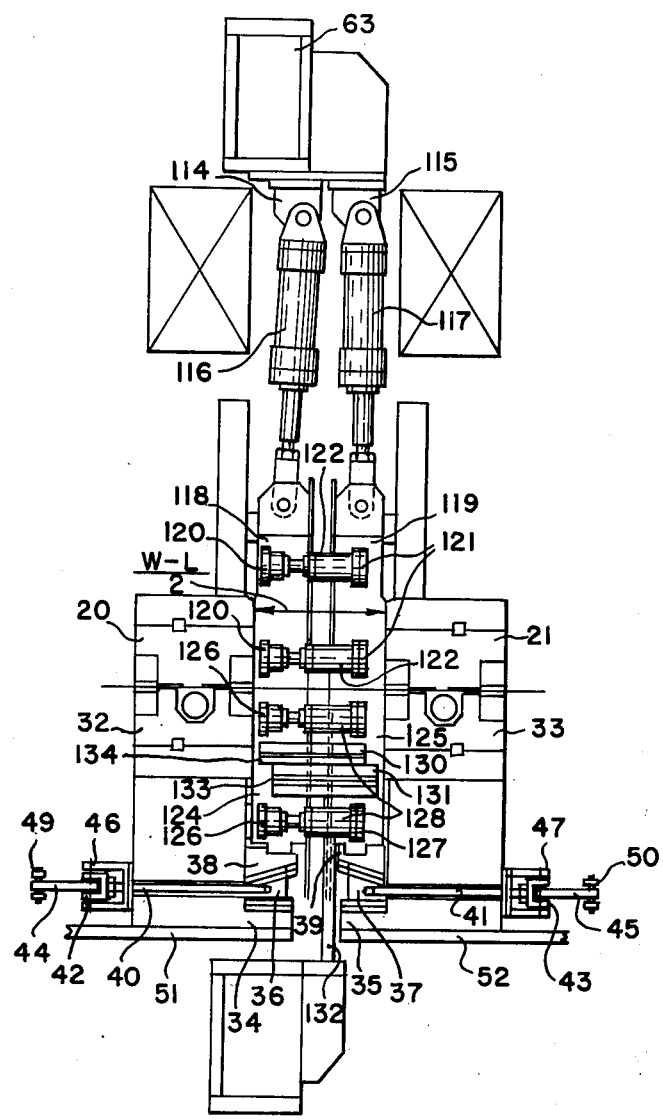
Figure 9:
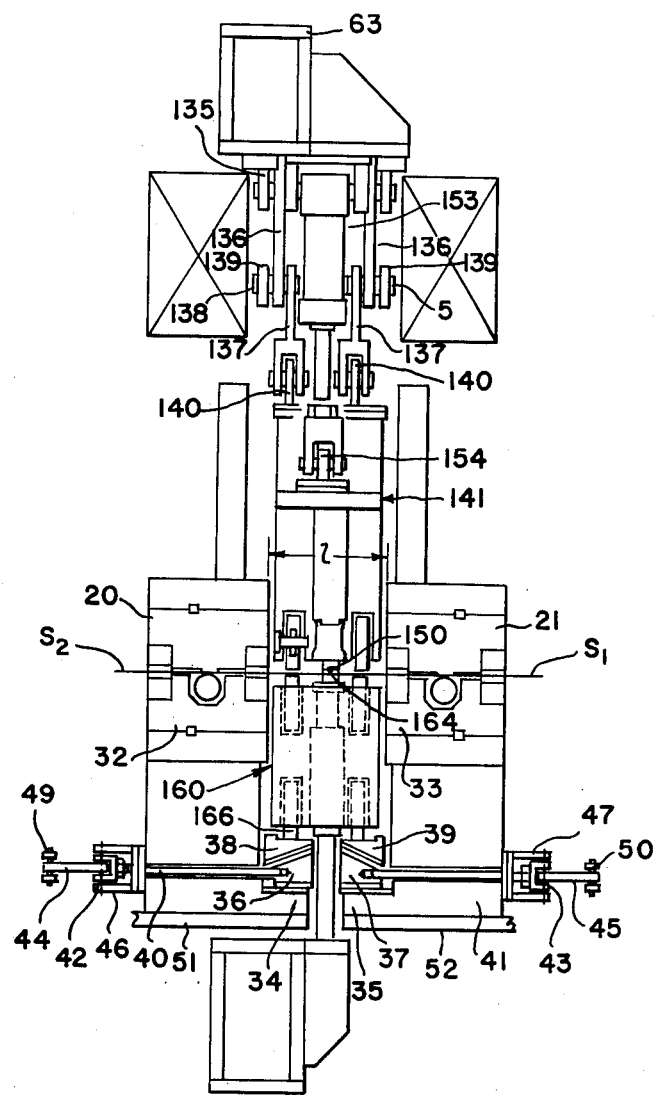

FIGS. 5(A) and 5(B) are sectional views, on enlarged scale, of a positioning device thereof; FIG. 5(A) showing the trailing and leading edges of the strips to be joined being located in shear position while in FIG. 5(B), the leading and trailing edges of the strips are cut by the shear unit;

FIG. 6(A) is a front view of a crop discharge device of the shear unit;

FIG. (B) is a side view looking in the direction indicated by the arrow VI in FIG. 6(A);

FIG. 7(A) is a front view of an electrode unit;

FIG. 7(B) is a front view of a device thereof for adjusting the height of the electrodes;

FIG. 8(A) is a front view of a flash trimmer unit;

FIG. 8(B) is a view looking in the direction indicated by the arrow VIII—VIII in FIG. 8(A);

FIGS. 9(A) through 9(D) are views used for the explanation of the welding step performed by the butt welding device, FIG. 9(A) showing the trailing edge of a first strip and the leading edge of a second strip located in position by the positioning device; FIG. 9(B), the trailing and leading edges cut by the shear unit; FIG. 9(C), the elctrodes brought into the operative positions; FIG. 9(D), the trailing and leading edges being welded; and FIG. (E), the flash trimmer unit removing the flashes from both the upper and lower surfaces of the strips joined;

FIGS. 10(A) through 10(M) are schematic views used for the explanation of the mode of operation of the butt welding device: FIG. 10(A) showing that the distance between the feed-side strip clamps is fixed at a determined value corresponding to the thickness of the strips, while the first strip to be welded is being transported to the next processing station; FIG. 10(B) showing that the shear unit is moved to the central position between the strip clamps when the trailing edge of the first strip has reached the down-stream side of the shear unit, and the positioning device is established in a predetermined condition by lowering the upper blade frame of the shear unit to a certain extent; FIG. 10(C) showing that the trailing edge of the first strip and the leading edge of the second strip are respectively located in shear position and clamped by the strip clamps; FIG. 10(D) showing that the upper blade of the shear unit is lowered so as to cut simultaneously the trailing edge of the first strip and the leading edge of the second strip; FIG. 10(E) showing that the upper blade ascends to the topmost position after the finish of the cutting operation; FIG. 10(F) showing that the box-shaped frame has moved in the direction perpendicular to the direction of the path of strip, and the shear unit has been carried outside the line; FIG. 10(G) showing that the box-shaped frame has further changed its position so that the welding electrodes whose manual distance corresponds to the thickness of the strips has been inserted into the inside of the line; FIG. 10(H) showing that the feed-side strip clamps have been moved to the downstream side over the distance close to the l shown in FIG. 10(F) by means of moving the feed-side frame; FIG. 10(I) showing that the feed-side strip clamps and the feed-side electrodes move toward the side of the discharge-side electrodes so that the butt welding can be made; FIG. 10(J) showing that the butt welding has been finished, and the box-shaped frame has moved in the direction perpendicular to the path of strip so that the electrodes reced from the line; FIG. 10(K) showing that the box-shaped frame has further moved so that the flash trimmer is carried into the inside of the line so as to cut off the flash of the welded area; FIG. 10(L) showing that the cutting of the flash has been finished and the flash trimmer and the strip clamps are released, and FIG. 10(M) showing that the strip, after being subjected to cutting, joining and trimming operations, is being transported to the next processing station.

Figure 11:
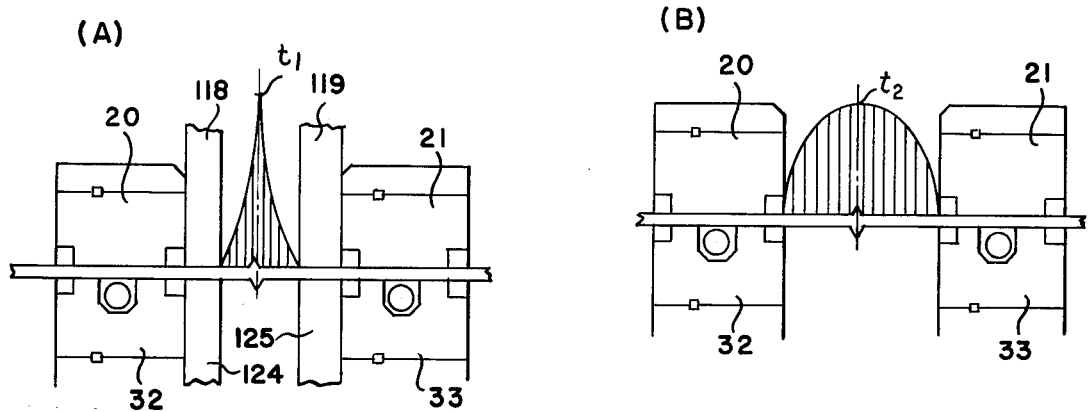
Figure 12:
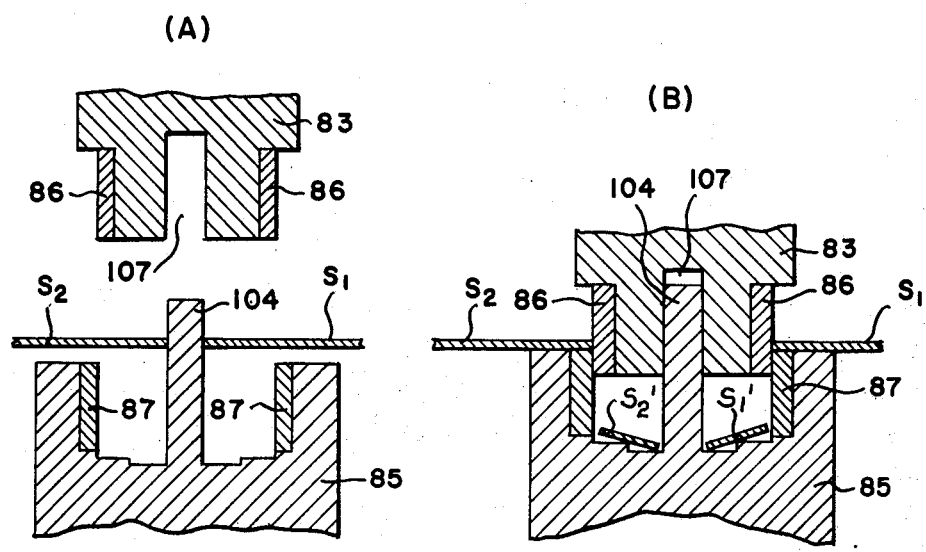

FIGS. 11(A) and 11(B) are views used for the explanation of the heat-treatment of the trailing and leading edges, FIG. 11(A) showing the temperature distribution in the strips when they are joined under upset pressure; and FIG. 11(B), the temperature distribution in the strips during the heat-treatment in accordance with the present invention;

FIG. 12-(9) is a sectional view of a modification of the strip positioning device and showing the trailing and leading edges of the strips located in position; and FIG. 12(B) is a view similar to FIG. 12(A) showing the trailing and leading edges cut by the shear unit.

Same reference numerals are used to designate similar parts throughout the FIGS.

The butt welding device in accordance with the present invention comprises, in general, a welder bad generally indicated by the reference numeral 2 and laid on the foundation 1, and box-shaped frame 63 in which are mounted a shear unit 72, an electrode unit 73 and a flash trimmer unit 74 and which is adapted to be displaced transversely of the path of the strips in the bed 2.

A frame 3 on the out side of the feed end of the welder bed 2 is carried by a bearing 4 supported on the bed 2 in such a way that the frame 3 may be movable along the path of the strip. One end of the piston rods 7 and 8 of rapid displacement cylinders 5 and cylinder 6 mounted on the bed 2 are attached to a bracket 9 which in turn is attached to the outer side surface of the feed-side frame 3. The other ends of the piston rods 7 and 8 are operatively coupled to a stroke adjusting device 10 mounted on the bed 2 and to stroke sensors 11 and 12 such as potentiometers.

A discharge-side frame 13 is carried by a thrust bearing 14 mounted on the discharge side of the bed 2 in such a way that the discharge side frame 13 may be vertically movable, and a cotter 16, which is guided by a cotter guide 15 attached to the inner surface of the discharge-side frame 13, is connected to a smaller-diameter rod 17 which in turn is operatively coupled to a cotter displacing device 19 mounted on a bracket 18 attached to the bed 2. The feed-side frame 3 is so arranged that when it is most closely moved toward the discharge side frame 13, it may be spaced apart from the frame 13 by a distance $l$.

Strip clamps 20 and 21 are located at the discharge end of the feed-side frame 3 and the feeding end of the discharge side frame 13 and operatively coupled to strip clamping cylinders 22 and 23, respectively, the upper ends of which are connected to connecting links 24 and 25, respectively. The upper ends of the connecting links 24 and 25 are pivoted to one ends of arm levers 26 and 27, respectively, the other ends of which are connected to the rods of hydraulic cylinders 28 and 29, respectively, mounted on brackets 30 and 31 attached to the feed-side and discharge-side frames 3 and 13, respectively. Lower strip clamps 32 and 33 are attached to the inside space of the frames 3 and 13, respectively, so that strip can be passed over the clamp, in opposed relation with the upper strip clamps 20 and 21, respectively. As best shown in FIG. 7(A), guides 34 and 35 with a plurality of dovetail grooves extended in the direction of the path of the strip are attached to the opposing surfaces of the lower strip clamps 32 and 33.

The ridges of wedges 36 and 37, which are extended and inclined in the direction of the path of strip, are fitted into the mating dovetail grooves formed in the lower surfaces of guide rails 38 and 39. As best shown in FIG. 7(B) and 9(B), rods 40 and 41 are attached at one end to the side surfaces of the wedges 36 and 37 closer to the lower strip clamps 32 and 33. The rods 40 and 41 are extended through holes formed through the lower strip clamps 32 and 33 in the direction of the path of strip, and the other ends of the rods 40 and 41 terminate into heads 42 and 43 which in turn are operatively coupled to levers 49 and 50 through L-shaped levers 44 and 45 pivoted to brackets 46 and 47 attached to the lower strip clamps 32 and 33. The lever 49 is driven by a suitable driving device 48 transversely of the direction of the path of strip.

Figure 1:
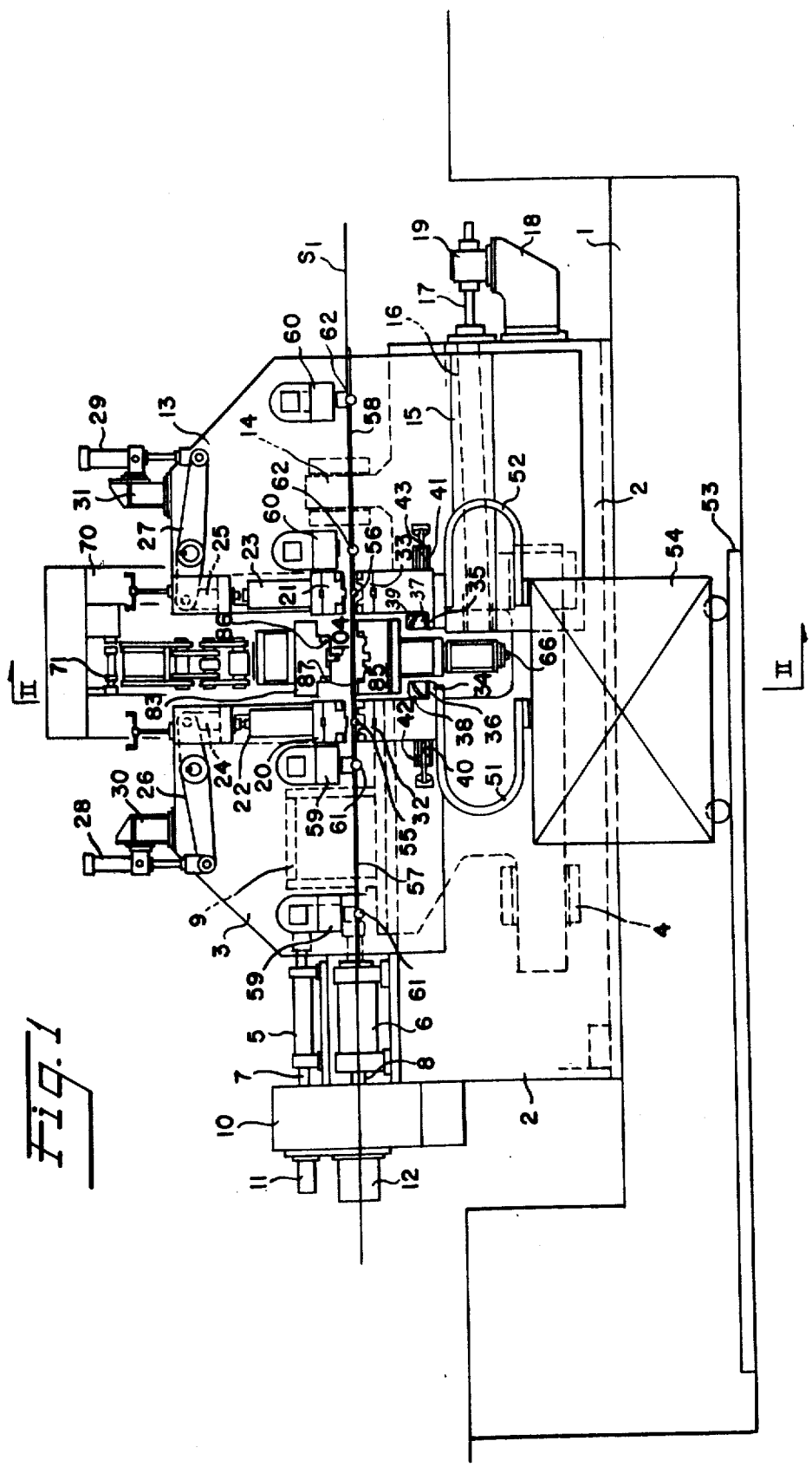
FIG. 1 is a front view of a butt welding device in accordance with the present invention.
Figure 8:
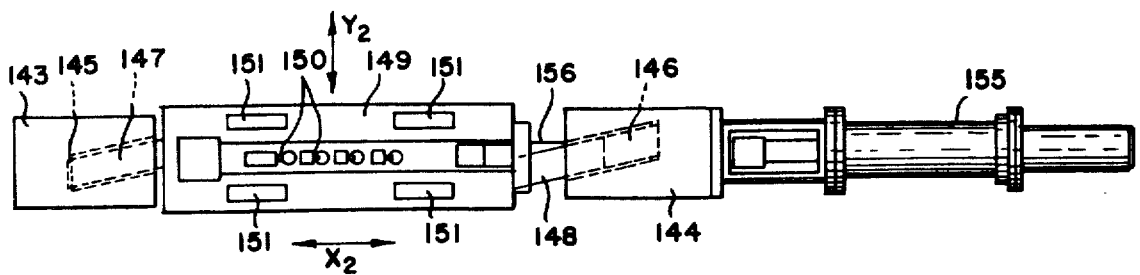
Figure 9:
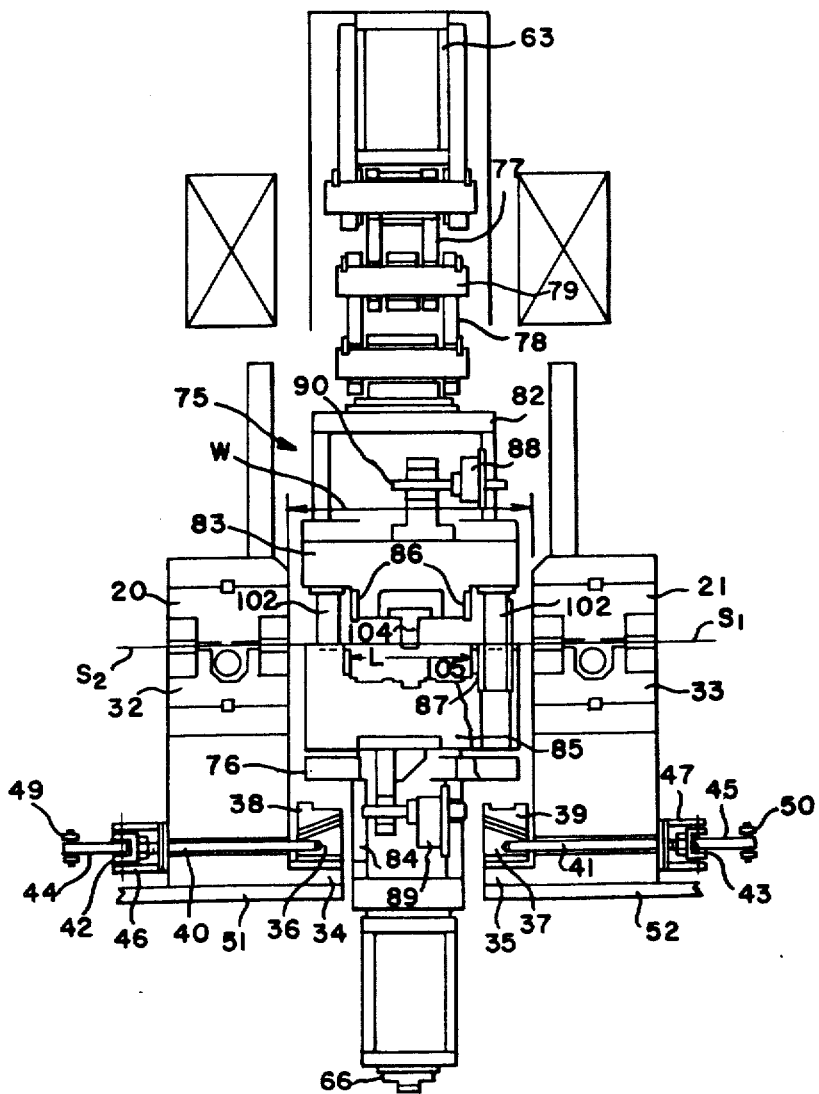
Figure 9:
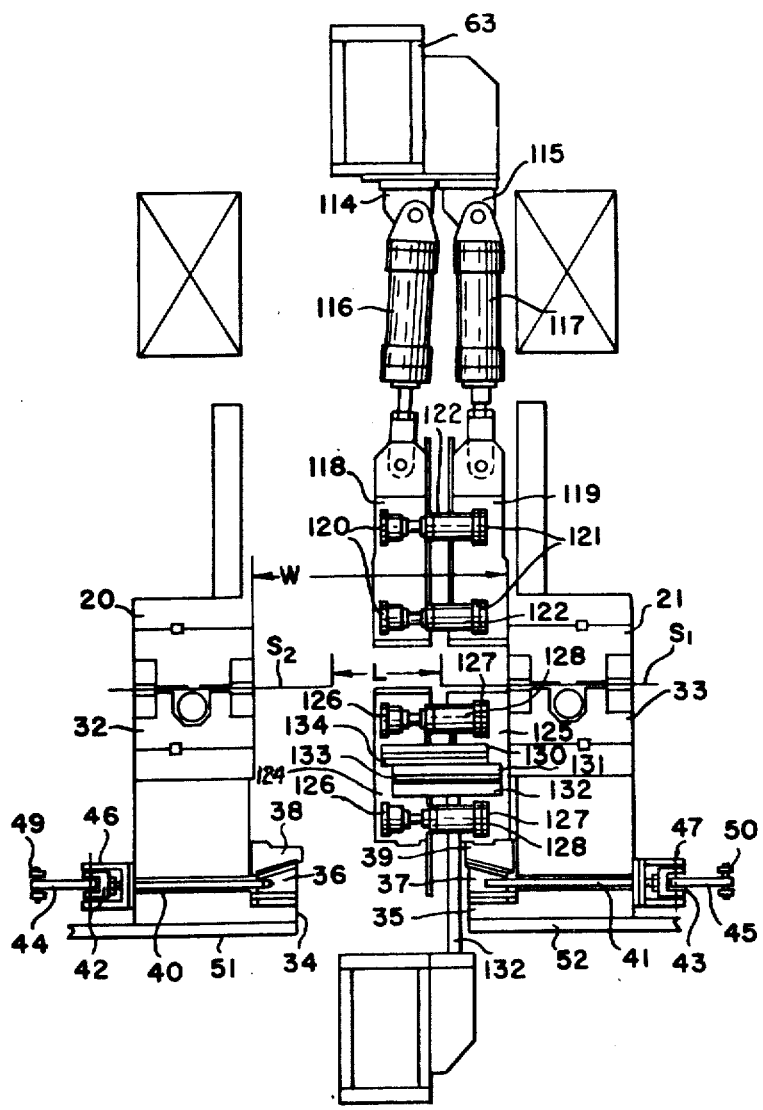
Figure 9:
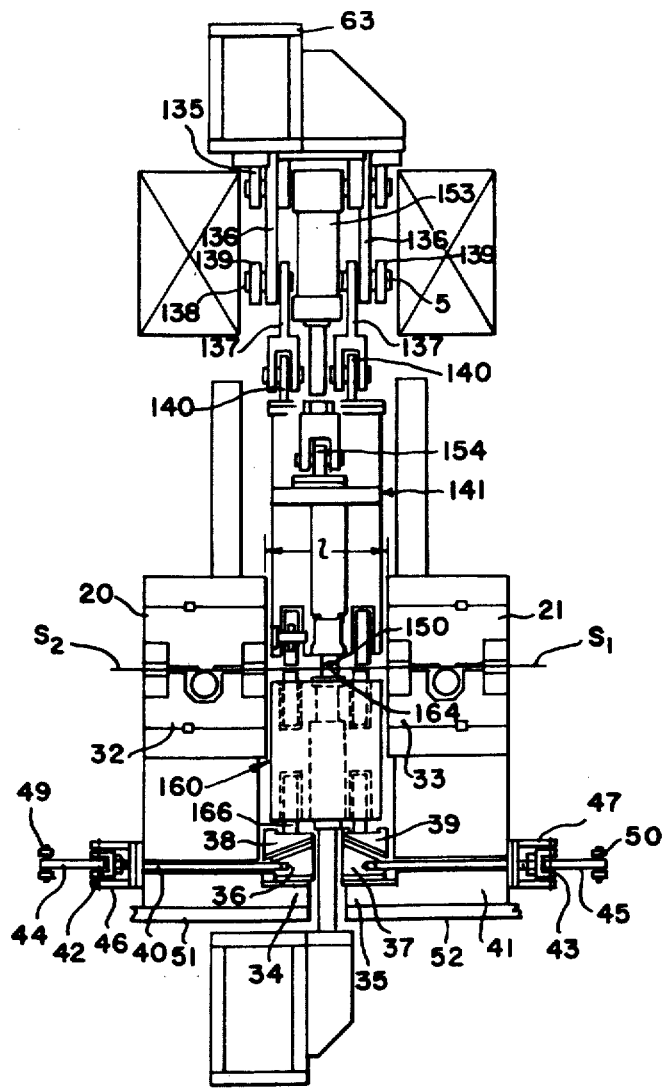
Figure 11:
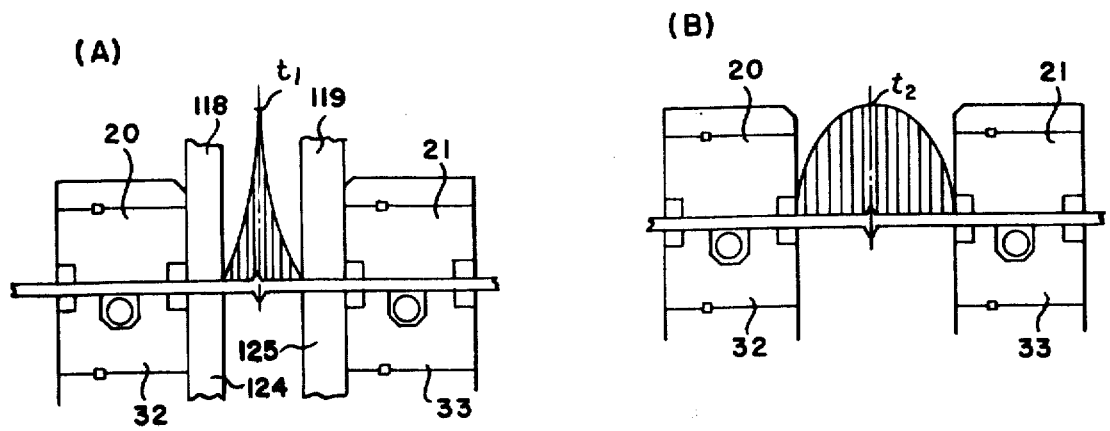
Figure 12:
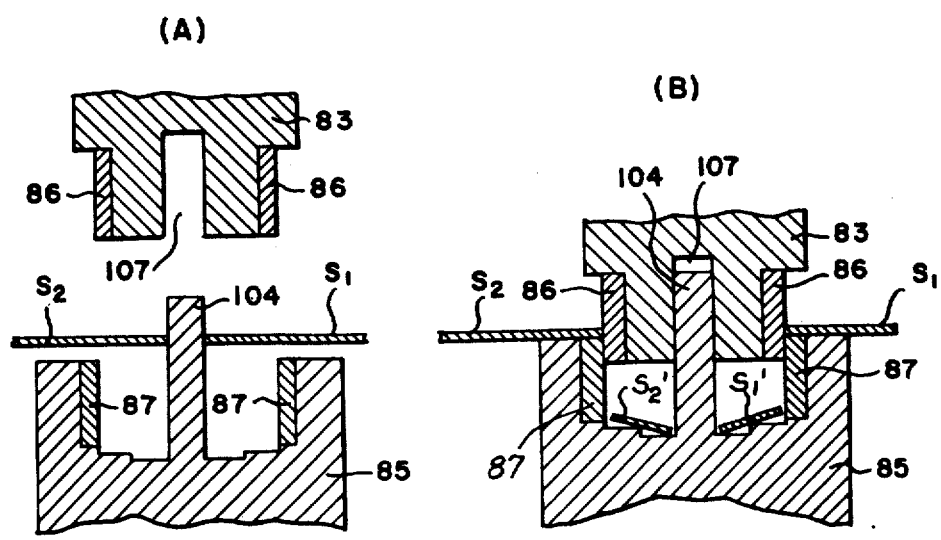

Referring back to FIG. 1, one end of a U-shaped flexible current feed plate 51 is in contact with the lower end of the lower strip clamp 32 in such a way that the feed plate 51 may follow both the horizontal and vertical movement of the lower strip clamp 32, and the other end of the feed plate 51 is electrically connected to a power transformer 54 which rides on rails 53 laid on the bottom of the pit. Another current feed plate 52 for the lower 33 is arranged in the same manner.

Guide rollers 55 and 56 which are attached to the lower ends of the upper strip clamps 20 and 21, are adapted to be located in the cavities formed in the upper surfaces of the lower strip clamps 32 and 33 so that when the strip is transported through the welding device, they support the strip at a suitable height above the lower strip clamps 32 and 33. Tables 57 and 58 for transporting the strips are attached to the feed-side and discharge-side frames 3 and 13, respectively, and side guides 59 and 60 are located at both ends of the tables 57 and 58 so that the trailing edge of the first strip $S_1$ and the leading edge of the second strip $S_2$ may be aligned with respect to each other in case of the welding step. The side guides 59 and 60 are driven by suitable driving means (not shown) transversely of the direction of the path of strip, and guide rollers 61 and 62 for guiding the strips S are attached to the under-surfaces of the side guides 59 and 60.

Figure 3:
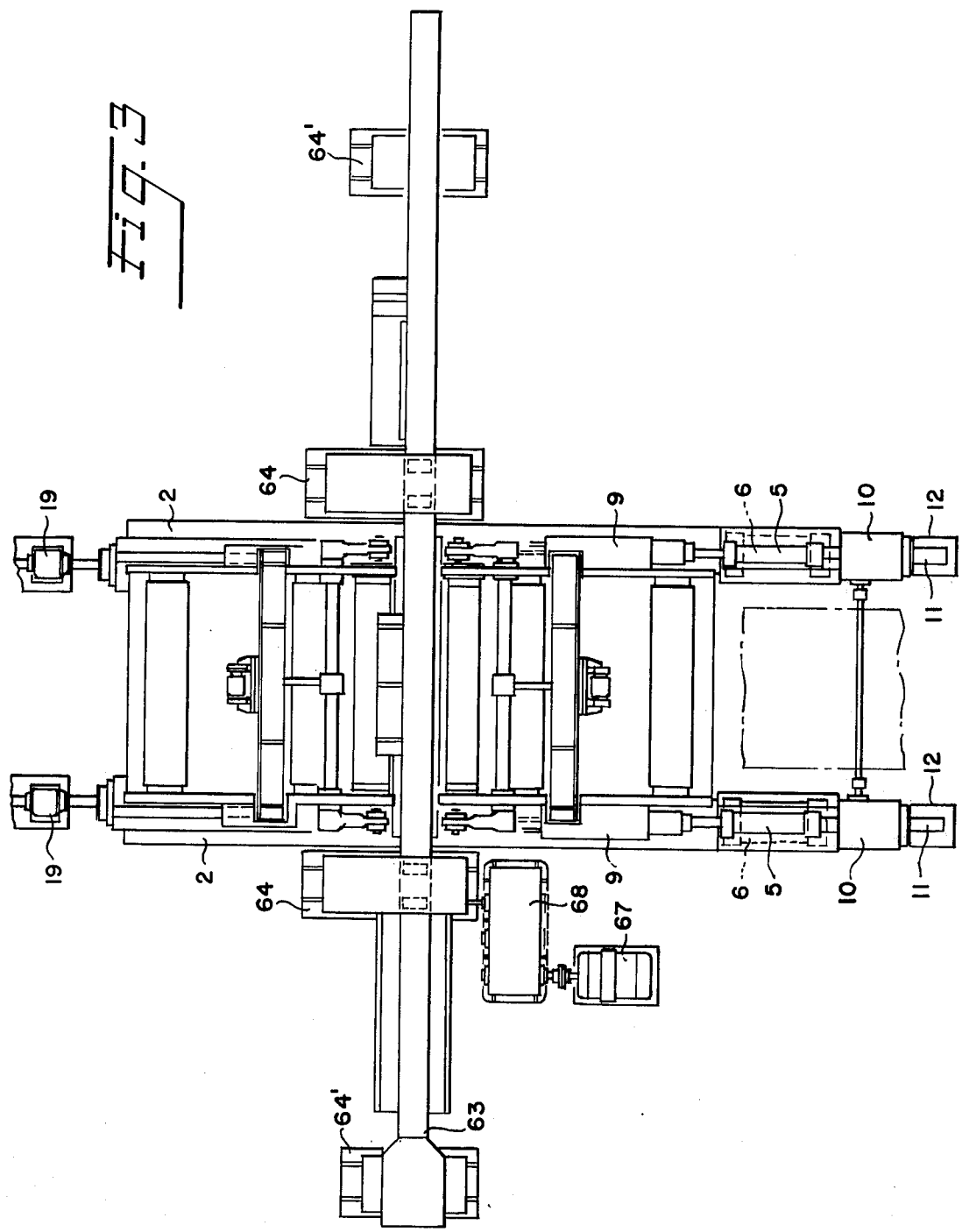

The box-shaped frame 63 in which are mounted the shear unit 72, the electrode unit 73 and the flash trimmer unit 74 is movable between the feed-side and discharge-side frames 3 and 13 transversely of the direction of the path of strip or bed 2. As best shown in FIG. 2, the frame 63 is supported by supporting rolls 65 rotatably attached to supporting frames 64 and 64' erected on the foundation 1, and a rack 66 attached to the undersurface of the frame 63 is made into engagement with a pinion 69 drivingly coupled through a reduction gear 65 to a driving motor 67 (See also FIG. 3). The upper side of the frame 63 is guided by guide rollers 71 rotatably attached to posts 70 extended from the frames 64. These guide rollers 71 have the dual function of supporting the frame 63 when the latter is displaced transversely of the bed 2 and of reinforcing the frame 63.

Figure 4:
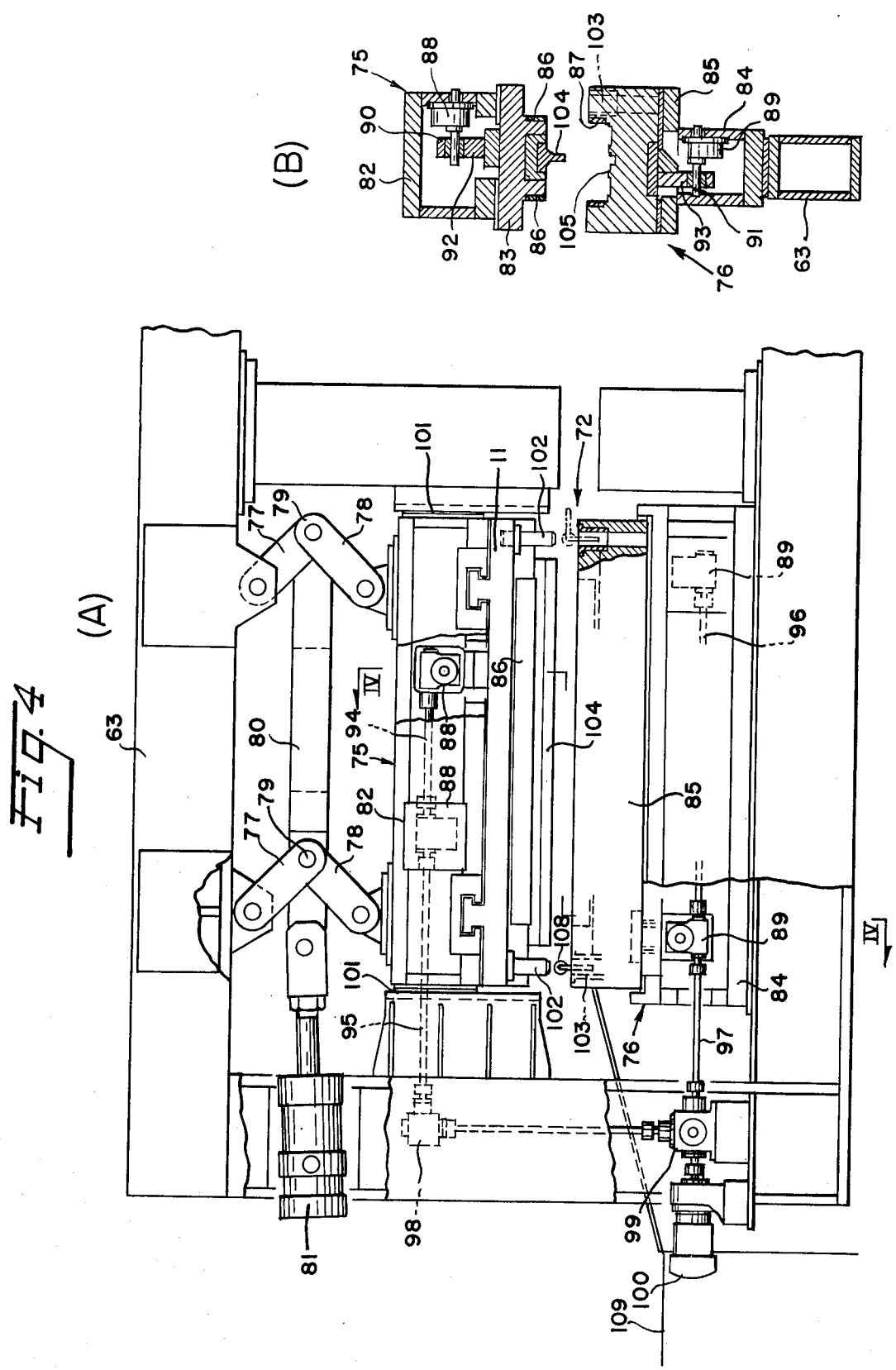
FIG. 4(A) is a front view of a shear unit thereof.
FIG. 4(B) is a side view thereof looking in the direction indicated by the arrow IV in FIG. 4(A)

The shear unit 72 is mounted in the box-shaped frame 63 for shearing the edges of the strips to be welded together, and comprises, as shown in FIG. 4, an upper blade frame 75 and a lower blade frame 76. The upper frame 75 is suspended from the frame 63 through two linkages each consisting of levers 77 and 78 pivoted to each other and to a link 80 with a pivot pin 79. One end of the link 80 is connected to the piston rod of a hydraulic cylinder 81 mounted on the frame 63. The upper blade frame 75 includes a main body 82 with dovetail grooves extended in the direction of the path of strip, and an upper blade holder 83 with ridges fitted into the dovetail grooves of the main body 82. Upper blades 86 are attached to the upper blade holder 83 and extended in the longitudinal direction of the holder 83; that is, transversely of the direction of the path of strip.

The lower blade frame 76 is mounted on the lower side of the frame 63, and includes a main body 84 with a plurality of dovetail grooves and a lower blade holder 85 with ridges fitted into the grooves of the main body 84. Within a cavity 105 formed in the upper surface of the lower blade holder 85 are located lower blades 87 which coact with the upper blades 86 for shearing the edges of the strips as will be described in detail hereinafter.

Within the upper and lower main bodies 82 and 84 are mounted reduction gears 88 and 89, respectively, as best shown in FIG. 4(B). The externally threaded end portion of the output shaft 90 (or 91) of the reduction gear 88 (or 89) is made into threadable engagement with an internally threaded hole of a bracket 92 (or 93) attached to the blade holder 83 (or 85). The input shaft of the reduction gear 88 is drivingly coupled through intermediate shafts 94 and 95 to a reduction gear 98 which in turn is operatively coupled through a shaft to a reduction gear 99 which in turn is operatively coupled to a geared motor 100. In like manner, the reduction gear 89 of the lower main body 84 is operatively coupled through an intermediate shafts 96 and 97 to the reduction gear 99.

The vertical movement of the upper blade frame 75 is guided by guides 101 attached to the side members of the box-shaped frame 63 and fitted over the side walls of the main body 82.

Guide pins 102 extended downwardly from the upper blade holder 83 are adapted to be inserted into mating guide holes 103 of the lower blade holder 85 when the upper blade frame 75 is lowered. At the midpoint between the upper blades 86 is extended a strip locating or positioning stopper 104 in parallel with the upper blades 86 for locating the edges of the strips to be cut off.

At the bottom of the cavity of channel 105 of the lower blade holder 85 are formed two transverse grooves 106 as best shown in FIG. 5 for slidably receiving therein projections 111 of a crop discharging device (See FIG. 6), and a transverse groove 107 for receiving therein the stopper 104 of the upper holder 83.

The crop discharging device generally indicated by the reference numeral 108 is supported on the lower blade frame 85 at a suitable position. The discharge device 108 is so arranged as to be displaced in the axial direction, that is, in the direction $Y_1$ in FIG. 6, of a rotary shaft 113 and the direction $X_1$ perpendicular to the direction $Y_1$. More particularly, when the rotary shaft 113 rotates about its axis, the projections 111 and 112 are inserted into the grooves 106 and 107 of the lower blade holder 85, and when the discharge device 108 is displaced in the direction $X_1$, the crops S1' and S2' are discharged from the cavity 105 in the lower blade holder 85. The discharged crops are transferred through a chute 110 into a bucket 109 (See FIGS. 2 and 4A).

The edges of the strips which have been sheared by the shear unit for the preparation of the welding are welded together by the electrode unit 73. Upper electrodes 118 and 119 are pivoted to hydraulic cylinders 116 and 117 which in turn are suspended from brackets 114 and 115 attached to the upper member of the box-shaped frame 63. The upper electrodes 118 and 119 have brackets 120 and 121 extended transversely of the direction of the path of strip, and a space-adjusting cylinder is interposed between the adjacent brackets 120 and 121. The brackets 121 which are longer than the brackets 120, are fitted into the grooves of guides 123 attached to the side members of the box-shaped frame 63.

Lower electrodes 124 and 125 which are located in opposed relationship with the upper electrodes 118 and 119, respectively, are substantially similar in construction to the upper electrodes 118 and 119. That is, transverse brackets 126 and 127 are extended from the lower electrodes 124 and 125, and the longer brackets 127 are fitted into guide grooves of guides 129 attached to the lower side members of the box-shaped frame 63. A space-adjusting cylinder 128 is interposed between the adjacent brackets 126 and 127.

Between the upper and lower brackets 126 and 127 are extended arms 130 and 131. As best shown in FIGS. 9(C) and 9(D), the arm 131 is supported on an insulating member 133 attached on a T-shaped supporting member 132, and the upper arm 130 is supported on an insulating member 134 which in turn is placed on the lower arm 131.

The upper and lower electrodes 118, 119, 124 and 125 are permitted to vertically move toward or away from each other, but the movement in the horizontal direction is restricted. When the electrode unit 73 is brought into the operative position, that is, into the strip line, the lower sides of the lower electrodes 124 and 125 slide over the guide rails 38 and 39 on the guides 34 and 35 attached to the lower strip clamps 32 and 33 (See FIG. 1).

The flash trimmer unit generally indicated by the reference numeral 74 is mounted in the box-shaped frame 63 for removing the flash and upset formed by the welding by the electrode unit 73. As shown in detail in FIG. 8A, the flash trimmer unit 74 comprises an upper tool holder 141 and a lower tool holder 160. The upper tool holder 141 is suspended from the box-shaped frame 63 by a linkage and a hydraulic cylinder 153. The linkage consists of a first pair of levers 136 and 137 having one end thereof pivotted with a common pivot pin to each other and to one end of a transverse link 139 and a second pair of arms 136 and 137 having one end thereof pivoted with a common pivot pin to each other and the other end of the transverse link 139. The other ends of the levers 136 are pivoted to brackets 135 attached to the box-shaped frame 63 while the other ends of the levers 137 are pivoted to brackets 140 attached to the upper tool holder 141. One end of the hydraulic cylinder 153 is pivoted to a bracket 152 attached to the box-shaped frame 63 while the other end, is pivoted to a bracket 154 attached to the upper tool holder 141.

The upper tool holder 141 comprises a holder mounting frame 142, guide frames 143 and 144 attached to the under and side face of the frame 142, and a main body 149 with arms 147 and 148 fitted into guide grooves 145 and 146, respectively of the guide frames 143 and 144 as best shown in FIG. 8(B). The arms 143 and 144 are inclined at an angle relative to the transverse direction perpendicular to the direction of the path of strip. A plurality of cutting tools 150 and a plurality of guide rollers 151 are attached to the undersurface of the main body 149 as best shown in FIG. 8(B).

A driving device 155 mounted adjacent to the guide frame 144 has the output shaft drivingly coupled to a rod 156 transversely extended from the main body 149. The side members of the holder frame 142 are fitted into guides 157 attached to the box-shaped frame 63 so that only the vertical movement of the upper tool holder may be permitted.

The lower tool holder 160 in supported by supporting blocks 158 and 159 mounted on the bottom member of the box-shaped frame 63. The lower tool holder 160 comprises guide frames 161 and 162 and a main body 163 with arms fitted into the guide grooves of the guide frames 161 and 162 in a manner substantially similar to that of the arms 147 and 148 of the upper tool holder 141. A plurality of cutting tools 164 for removing the flash formed on the undersurface of the joined strip and a plurality of guide rollers 165 are attached to the upper surface of the main body 163, and guide rollers 166 for traveling along the guide rails 38 and 39 are attached to the undersurface of the main body 163. The lower tool holder 160 is drivingly coupled to a driving device 167 in a manner substantially similar to that described above with reference to the driving device 155 for the upper tool holder 141 in order to adjust the horizontal position of the main body 163 as will be described in detail hereinafter.

When the first strip S1 is unwound from a pay-off reel (not shown) and transported to the next processing station, the hydraulic cylinders 28 and 29 are extended to rotate the levers 26 and 27, thereby lifting the upper strip clamps 20 and 21 to the upper or inoperative position. Therefore, the guide rollers 55 and 56 of the upper strip clamps 20 and 21 are also lifted to the upper position (see FIG. 1) in the strip line to support the first strip S1 away from the lower strip clamps 32 and 33.

When the motor 67 is energized, the driving power is transmitted through the reduction gear 68 to the pinion 69 in engagement with the rack 66 so that the box-shaped frame 63 is displaced in the transverse direction. Therefore, the shear unit 72 with the upper blade frame 75 maintained in the upper position by the cylinder 81 is brought into the space in the strip line between the feed-side and discharge-side frames 3 and 13. Since the upper blade frame 75 is kept in the lifted position, the upper blade holder 83 will not interfere with the travelling strip S1. After the shear unit 72 has been placed in the operative position in the strip line, the rapid-displacement cylinder 5 and the upset cylinder 6 are moved to adjust the spacing W (See FIG. 10(A)) between the upper strip clamps 20 and 21 and between the lower strip clamps 32 and 33 depending upon the thickness of the strip. Thereafter, the geared motor 100 is energized to drive the reduction gears 88 and 89 through the reduction gears 99 and 98 and the intermediate shafts 95, 94, 97 and 96 so that the rotation of the output shafts 90 and 91 of the reduction gears 88 and 89 causes the displacement of the brackets 92 and 93 in the direction of the path of strip. As a result, the upper and lower blade holders 83 and 85 are displaced in the direction of the path of strip, whereby they are located substantially at the midpoint roughly between the upper and lower strip clamps 20, 21, 32 and 33.

While the first strip S1 is being transported to the next station, the second strip S2 is rewound for the preparation of the welding of the leading edge thereof to the trailing edge of the first strip S1. When the trailing edge of the first strip S1 passes the discharge end of the butt welding device, a bridle roll (not shown) is stopped in response to a sensor (not shown) at the discharge end of the welding device so that the trailing edge is stopped. Since the continuous transport of the first strip to the next station is carried out by a conventional accumulator even when the bridle roll is stopped, the continuous processing of the first strip S1 in the next station is not affected at all.

When the trailing edge of the first strip S1 is stopped in the manner described above, the hydraulic cylinder 81 of the upper blade frame 75 of the shear unit 72 is extracted so that the upper blade frame 75 is lowered until the lower edge of the positioning stopper 104 is located slightly below the upper surface of the lower strip clamps 32 and 33 as shown in FIG. 10(B). Thereafter, the bridle roll is reversed so as to return the trailing edge of the first strip S1 toward the welding machine until the trailing edge contacts with the positioning stopper 104. Concurrently, the second strip S2 is unrolled by a pinch roller (not shown) until the leading edge thereof contacts with the stopper 104. Thus, both the trailing edge of the first strip S1 and the leading edge of the second strip S2 are suitably positioned. Even when the trailing and leading edges strike against the stopper 104 so that they are deformed, they are cut off as will be described in detail hereinafter so that the deformations of the trailing and leading edges will not adversely affect the welding operation.

After the trailing and leading edges are positioned in the manner described above (See FIG. 5(A)), the side guides 59 and 60 (See FIG. 1) are energized to displace the strips S1 and S2 transversely of the path of strip so that the strips S1 and S2 are correctly aligned to each other. Thereafter, the hydraulic cylinders 28 and 29 are further moved to lower the upper strip clamps 20 and 21, thereby clamping the first and second strips S1 and S2 against the lower strip clamps 32 and 33 under the forces produced by the strip-clamping cylinders 22 and 23 (See FIGS. 9A and 10(C)). Concurrently, a looper (not shown) is moved to form a loop of the second strip S2 at the position suitably spaced apart from the butt welding device.

Thereafter the cylinder 81 is retracted to lower the upper blade frame 75 so that the trailing and leading edges of the strips S1 and S2 are cut off simultaneously by the upper and lower blades 86 and 87 (See FIGS. 5(B) and 10(D)). The cutout portions or crops S1' and S2' drop into the cavity 105 of the lower blade holder 85. The length L (See FIG. 9(B)) of the cutout portions of the trailing and leading edges of the strips are dependent upon the spacing between the lower blades 87, and are therefor constant. As a result, the margin of each strip extended from the strip clamps into the space therebetween after the edges are cut off is equal to W-L/2. Therefore, the margin may be suitably selected by selecting the spacing W between the strip clamps. After cutting, the cylinder 81 is extended to lift the upper blade frame 75 away from the lower blade frame 85 (See FIGS. 9B and 10(E)), and the motor 67 is driven again to displace the box-shaped frame 63 so that the shear unit 72 may be moved away from the strip line while the electrode unit 73 may be brought into the strip line or in the operative position (See FIGS. 10(F) and 10(G)).

When the electrode unit 73 is brought into the strip line, the box-shaped frame 63 is positioned as best shown in FIG. 2. The crop discharge device 108 is brought to one side (on the side close to the strip line) as shown in FIG. 6(A) and indicated by the solid lines. Thereafter, the discharge device 108 is displaced by suitable driving means (not shown) toward the lower blade holder 85 in the direction indicated by the arrow $Y_1$ until the longest projection 112 of the discharge device 108 may be aligned with the stopper 104. Next the shaft 113 of the discharge device 108 is rotated through 90° by a suitable driving means (not shown) so that the projections 111 and 112 are inserted into the guide grooves 106 and 107 as indicated by the broken lines in FIG. 6(A). Next the discharge device 108 is displaced in the direction $X_1$, pushing the crops S1' and S2' in the cavity 105 of the lower blade holder 85 toward the other side of the shear unit. The crops S1' and S2' are discharged through the chute 110 into the bucket 109. Thereafter, the movements or operations of the discharge device 108 are reversed to bring it to its initial or inoperative position.

As the electrode unit 73 is brought into the strip line, its upper and lower electrodes 118, 119, 124 and 125 also are brought into the strip line. The lower electrode 125 is guided and located in position by the guide rail 39 of the lower strip clamp 33 so that the front surfaces of the upper and lower electrodes 119 and 125 are made into contact with the rear surfaces of the upper and lower strip clamps 21 and 33 (See FIGS. 9(C) and 0(G)). Since the top surface of the lower electrode 125 is located below the undersurface of the strip, the former will not contact with the strip when the electrode unit 73 is brought into the strip line or operative position. Thereafter, the feed-side frame 3 with the upper and lower strip clamps 20 and 32 clamping the second strip S2 is displaced by the rapid-displacement cylinder 5 toward the discharge-side frame 13 over a distance equal to the cutout length L so that the trailing edge of the first strip S1 and the leading edge of the second strip S2 are made into contact with each other or brought to the position whereby they almost contact with each other. The lower edge of the lower electrode 124 is fitted into the groove of the guide rail 38 of the lower strip clamp 32 while the rear surfaces of the upper and lower electrodes 118 and 124 are made into contact with the front surfaces of the upper and lower strip clamps 20 and 32. During th displacement of the feed-side frame 3 toward the discharge-side frame 13, the top surface of the lower electrode 124 is located below the upper surface of the lower strip clamp 32 so that the lower electrode 124 may be prevented from striking against the strip S2.

Next the driving device 48 (See FIG. 7(B)) is energized to draw the bars 49 and 50 so that the rods 40 and 41 also are drawn to pull the edges 36 and 47. Therefore, the guide rails 38 and 39 are lifted so that the lower electrodes 124 and 125 are raised to contact with the undersurfaces of the first and second strips S1 and S2. Concurrently, the cylinders 116 and 117 are extended to lower the upper electrodes 118 and 119. Thus, the edges of the strips S1 and S2 are clamped by the upper and lower electrodes 118, 119, 124 and 125 (See FIGS. 9(D) and 10(H)).

Thereafter, the current is fed from the transformer 54 (See FIG. 1) through the current feed plates 51 and 52, the guides 34 and 35, the wedges 36 and 37 and the lower strip clamps 32 and 33 to the strips S1 and S2 so that the edges of the strips S1 and S2 are heated and melted by the heat generated by the contact resistance therebetween while the second strip S2 is advanced by the upset cylinder 6 toward the first strip S1 at a speed depending upon the thickness of the strips. In this case, the spacing cylinders 122 and 128 are slightly shortened as the strip S2 is advanced. When the metal at the joint is molten, the suitable upset pressure is applied by rapidly advancing the strip S2 over a small distance toward the strip S1, whereby the flash butt welding is completed. (See FIGS. 9(D) and 10(I)). The flash is formed along the joint between the strips S1 and S2. Since the spacing cylinders 122 and 128 are retracted in proportion to the speed of the strip S2, the upper and lower strip clamps 20 and 32, the upper and lower electrodes 118 and 124, the upper and lower strip clamps 21 and 33 and the upper and lower electrodes 119 and 125 are pressed against each other under the constant pressure so that the welding current may smoothly flow and consequently the satisfactory weld may be formed.

FIG. 11(A) shows the temperature distribution at the edges of the strips S1 and S2 when the current flows. Therefore, when the upper strip clamps 20 and 21 are lifted after the welding current flow has been interrupted, the sudden temperature drop of the joint occurs, resulting in hardening of the joint. According to the present invention, after the current flow is interrupted, the upper electrodes 118 and 119 are lifted by the cylinders 116 and 117 while the lower electrodes 124 and 125 lowered along the guide rails 38 and 39, and thereafter the current for after-treatment is made to flow through the current feed plates 51 and 52 into the lower strip clamps 32 and 33 so that the temperature distribution is established at the joint as shown in FIG. 11(B). Since the temperature $t_2$ is lower than the temperature $t_1$ and the temperature gradient is low, the rapid cooling of the joint may be prevented even after the after-treatment current is interrupted. Thus, hardening of the joint may be prevented.

When the thickness of the first and second strips S1 and S2 is different, the cotter driving device 19 is energized to vertically displace the discharge-side frame 13 so that the trailing edge of the first strip S1 may be brought to a suitable height for flash butt welding to the leading edge of the second strip S2.

While the welding proceeds in the manner described above, the adjustment of the flash trimmer unit 74 is carried out for removing the flash. Since the edge margins of the strips S1 and S2 are different depending upon the thickness of the strips to be joined, the weld line is also displaced in the direction of the pass of strip. Therefore, in order to align the flash trimmer unit 74 with the weld line, the driving devices 155 and 167 (See FIG. 8) are energized to pull or push the main bodies 149 and 163, thereby causing them to be displaced in the transverse direction (the direction indicated by the double-pointed arrow $X_2$ in FIG. 8(B)). Since the inclined arms 147 and 148 of the main bodies 149 and 163 are inserted into the guide grooves of the guide frames 143, 144 161 and 162, when the main bodies 149 and 163 are displaced transversely, they are also displaced in the direction of the pass of strip; that is, the direction indicated by the double pointed arrow $Y_2$ in FIG. 8(B) so that the center lines of the upper and lower cutting tools 150 and 164 may be correctly aligned with the weld line. Thereafter, the cylinder 153 is extended to lower the upper tool holder 141 until the upper rollers 151 contact with the lower guide rollers 165. (See FIG. 8(A)).

After the after-treatment is completed, the motor 67 is driven to displace the box-shaped frame 63 so that the electrode unit 73 may be displaced out of the strip line (See FIG. 10(J)) while the flash trimmer unit 74 may be brought into the strip line (See FIG. 10(K)). When the unit 74 is advanced into the strip line, the front upper rollers 151 (the right rollers in FIG. 8(A)) engage the side edges of the strips S1 and S2 while the front lower rollers 165 contact with the undersurfaces of the strips. As the box-shaped frame 63 is advanced, the upper rollers 151 ride over the upper surfaces of the strips. Since the upper tool holder 141 is coupled through the linkage to the upper member of the frame 63, the holder 141 and hence the rear upper guide rollers 151 (the left ones in FIG. 8(A)) are also raised. Therefore, the upper cutting tools 150 are spaced apart from the cutting tools 164 by a distance equal to the thickness of the strips.

Consequently, as the box-shaped frame 63 is displaced, the upper and lower cutting tools 150 and 164 are forced to move along the weld line, thereby removing the flash. When the flash trimmer unit 74 is displaced transversely of the strips, the guide rollers 166 of the lower tool holder 160 ride on the guide rails 38 and 39 of the lower strip clamps 38 and 39 so that the forces applied to the lower cutting tools 164 may be received by the guide rails 38 and 39 through the guide rollers 166. The forces acting at right angles to the upper cutting tools 150 are encountered by the hydraulic cylinder 153. Thus, the satisfactory flash removal may be ensured. (See FIGS. 9(E) and 10(K)).

After the flash has been removed in the manner described above, the hydraulic cylinder 153 lifts the upper tool holder 141 away from the strips while the strip clamping cylinders 22 and 23 lift the upper strip clamps 20 and 21 away from the strips (See. FIG. 10(L)). Therefore, the guide rollers 55 and 56 of the upper strip clamps 20 and 21 contact with the undersurfaces of the joined strips. Next the bridle roll (not shown) is driven to transport the joined strip to the next station (See. FIG. 10(M)).

While the joined strip is being transported to the next station, the box-shaped frame 63 is returned to the initial position so that the shear unit 72 may be brought into the strip line again for the next operation.

In the modified strip positioning means shown in FIG. 12, the stopper 104 for positioning the trailing edge of the first strip S1 and the leading edge of the second strip S2 is extended upwardly from the lower tool holder 85 while the mating groove 107 is formed in the upper tool holder 83.

It is to be understood that the present invention is not limited to the preferred embodiment described above with reference to the accompanying drawing and that various modifications may be effected without departing the true spirit of the present invention.

The features of the butt welding device in accordance with the present invention may be summarized as follows:

I. Since the positioning of the preceding or first strip and the succeeding or second strip, the welding and the removal of the flash and upset may be continuously accomplished at the same position, the highly reliable weld joint may be attained automatically and rapidly, and consequently the labor saving may be attained.

II. After the trailing edge of the first strip and the leading edge of the second strip have been correctly positioned, and firmly clamped, they are simultaneously cut off for edge preparation so that the readjustment of the edges is not required and that the edges to be joined may be held in position for optimum welding. Therefore, the use of the gage bars, the cross adjusting devices or the like used in the conventional flash butt welding machines may be eliminated.

III. The distance between the strip clamps may be suitably adjusted in case of the shearing action, and the electrodes with the predetermined width are brought into the strip line and made to contact with the strips for welding. Therefore, unlike the prior art welding machines in which the adjustment of the edge margin is stepwise, the stepless adjustment of the edge margin may be attained depending upon the thickness of the strips to be joined.

IV. The electrode unit is displaced out of the strip line after the completion of the welding step so that the sludge attached to the upper and lower electrodes may be easily removed and consequently extra current may be minimized in the next welding step.

V. Since the edge preparation, welding and removal of the flash may be carried out at the same place, the design of the welding device may be much facilitated and simplified. Since the shear unit, the electrode unit and the flash trimmer unit may be displaced out of the strip line, their maintenance may be much facilitated.

VI. Since the shear unit, the electrode unit and the flash trimmer unit may be brought into and moved away from the operative position in the strip line between the strip clamps on the feed-side frame and the clamps on the discharge-side frame, the rapid operation may be ensured.

VII. Since the positioning means for positioning the edges of the strips to be joined is incorporated in the shear unit, the damages by scales or the like may be prevented, the positioning may be accomplished with a higher degree of accuracy, and the positioning device with the satisfactorily high mechanical strength may be fabricated in a simple manner at a less cost.

VIII. Since the edges of the strips are cut off while the strips are firmly held in position by the strip clamps, the cut-off edges may have a higher degree of parallelism.

IX. Even when the thickness of the strips to be joined is different, the optimum adjustment of the edge margin may be carried out automatically prior to the welding step.

X. The discharge of crops or cutoff edge portions may be automatically, safely and positively carried out.

XI. When the lower electrodes are brought into the strip path or moved out therefrom, the upper surfaces of the lower electrodes may be prevented from contacting with the undersurfaces of the strips so that the wear and abrasion of the upper surfaces of the lower electrodes may be minimized.

XII. Since the lower electrodes may be raised after the upper and lower electrodes have been brought into the predetermined position, the complete contact with the undersurfaces of the strips and the upper surfaces of the lower electrodes may be ensured. Therefore it is not necessary to apply the excessive clamping forces so that the satisfactory weld may be attained.

XIII. Since the heat-treatment may be accomplished within a short time after welding, the overall operation time may be considerably reduced.

XIV. Since the heat-treatment is carried out by passing the current through the strip clamps after the electrodes are moved away from the strips, the electric power saving may be attained.

XV. The heat-treatment provides the highly reliable joints.

XVI. The center line of the flash trimmer unit may be automatically aligned with the weld line which is generally located at the midpoint between the strip clamps so that the flash removing operation may be accomplished in a safeguarded, simple yet reliable manner.

XVII. Since the location of the weld line is dependent upon the thickness of the strips to be joined, the alignment of the flash trimmer unit with the weld line may be previously accomplished. While the flash trimmer unit is being advanced into the strip line by the box-shaped frame, it removes the flash so that the flash removal time may be reduced and blue-cutting may be possible.

XVIII. When the flash trimmer unit is displaced, the rollers of the upper tool holder are pressed against the rollers of the lower tool holder, and when the upper and lower rollers sandwich the strips, the spacing between the upper and lower cutting tools may be automatically determined. Therefore, no special means for setting the spacing between the upper and lower cutting tools is required. Furthermore, the spacing can automatically follow the thickness of the strips, the automation of the butt welding device may be much facilitated.

XIX. During the flash removing step, the lower tool holder is supported through the guide rollers by the guide rails of the lower strip clamps so that the adjustment of the height of the lower tool holder is not required.

What is claimed is:

1. A butt welding device for welding the ends of strip material movable along a path of travel, comprising a bed, a feed side frame mounted on the bed for reciprocal movement along the direction of said path of travel, strip clamping means mounted on a discharge side of the frame, a box-shaped frame mounted on said bed and movable transversely of said path of travel, a shear unit mounted on said box-shaped frame for cutting off the ends of the strips to be welded, an electrode unit mounted on the box-like frame to clamp the strips and butt weld them together, said strip clamping means including two pairs of opposed clamping devices for respectively clamping adjacent ends of a pair of strips, said box-shaped frame being movable to bring the shear unit into position to shear the clamped ends of the strips, means for moving the box-shaped frame to another position to move said electrode unit in position to butt weld the ends together, a flash trimmer unit mounted on said box-shaped frame and adapted to remove the flash formed along the joint between the strips, a rapid displacement cylinder mounted on said bed for moving the first named frame toward said electrode unit, and an upset cylinder mounted on said bed for applying upset pressure to the strips during butt welding.

2. A butt welding device as set forth in claim 1 which includes a discharge frame carried by said bed and positioned at the discharge side of the shear unit, and means for moving the latter frame vertically while restraining it from movement in the path of travel of the strip material.

3. A butt welding device as set forth in claim 1 wherein said electrode unit comprises at least two upper electrodes suspended from said box-shaped frame for vertical movement, and at least two lower electrodes, means for supporting the lower electrodes on said box-shaped frame including horizontally disposed arms and means for supporting the lower sides of the lower electrodes when the electrode unit is brought into operative position for welding.

4. A butt welding device as set forth in claim 1 wherein said electrode unit includes first upper and lower electrodes for clamping an end of a leading strip, second upper and lower electrodes for clamping an end of a following strip, and cylinder means interposed between the first and second upper electrodes and between the first and second lower electrodes for adjusting and holding the spacing therebetween.

5. A butt welding device as set forth in claim 1, wherein said device includes current feed plates electrically attached to the lower clamps of said strip clamping means, and a power transformer electrically connected to said current feed plates and movable in the direction of the path of travel, whereby when the electrodes of said electrode unit are moved away from the strips after welding, the current may be fed again through said lower clamps so as to accomplish the after heat-treatment of the welded joint.

6. A butt welding device as set forth in claim 1 wherein said flash trimmer unit comprises an upper tool holder suspended from an upper portion of said box-shaped frame for vertical movement, a lower tool holder attached to a lower portion of said box-shaped frame, guide frames disposed on both sides of said upper and lower tool holders and provided with vertical guide grooves each inclined at an angle relative to the direction of the travel of the strip an upper main body with a plurality of upper cutting tools so arrayed as to remove the flash on the upper side of the joint between the strips and having arms slidably fitted into said guide grooves of said guide frames for said upper tool holder, and a lower main body with a plurality of lower cutting tools so arrayed as to remove the flash on the undersurface of the joint and having arms slidably fitted into said guide grooves of said guide frames for said lower cutting tool holder.

7. A butt welding device as set forth in claim 1, wherein said flash trimmer unit comprises a parallel-four-bar linkage having upper pivot points pivoted to an upper portion of said box-shaped frame, an upper main body pivoted to said linkage at the lower pivot points thereof, and including rollers adapted to ride over the upper surfaces of the joined strips when said flash trimmer unit is brought into the operative position, and a lower main body pivoted to a lower portion of said box-shaped frame and including rollers adapted to support the undersurfaces of the joined strips, thereby coacting with said rollers of said upper main body to sandwich said strips therebetween.

8. A butt welding device as set forth in claim 1 wherein said shear unit comprises:
a main body frame suspended from said box-shaped frame for vertical movement;
an upper blade frame attached to said main body frame for slidable movement in the direction of the path of travel and including upper blades attached to the front and rear side surface of said upper blade frame; a lower main body frame attached to said box-shaped frame; and
a lower blade frame attached to said lower main body frame for slidable movement in the direction of the path of travel and including lower blades attached to the front and rear side surfaces thereof for coacting with said upper blades to cut off widthwise the edges of the strips to be joined.

9. A butt welding device as set forth in claim 1 wherein:
a channel having a U-shaped cross sectional configuration is formed in the upper surface of the lower blade frame of said shear unit, extending in the longitudinal direction of said lower frame, a groove for receiving therein a positioning stopper extended from the upper blade frame of said shear unit is formed in the bottom of said channel substantially along the center line thereof, at least two grooves are formed in the bottom of said channel on both sides of said stopper receiving groove in parallel therewith and spaced apart therefrom, and crop discharge means comprising a rod rotatable about the axis thereof and three projections extended from one end portion of said rod and having the configurations adapted to be inserted into said stopper receiving groove and said at least two grooves, whereby when said crop discharge means is advanced and rotated so as to insert said projections into said grooves and when said crop discharge means is moved in the longitudinal direction in said channel, the crops of the edges of the strips may be discharged out of said channel.

* * * * *

UNITED STATES PATENT AND TRADEMARK OFFICE
CERTIFICATE OF CORRECTION

PATENT NO. : 4,063,061
DATED : December 13, 1977
INVENTOR(S) : Yoshiharu Fujino et al.

It is certified that error appears in the above-identified patent and that said Letters Patent are hereby corrected as shown below:

On the cover page change item [73] to read --Assignees: Ishikawayima-Harima Jukogyo Kabushiki Kaisha, Tokyo, Japan; Nippon Kokan Kabushiki Kaisha, Tokyo, Japan--

Column 1, line 25, change "be" to --by--; line 30, change "of" to --or--; line 34, change "spacer" to --space--; line 41, change "area" to --are--; line 45, change "the" to --The--; and line 64, change "(B)" to --6(B)--

Column 2, line 12, change "(E)" to --9(E)--

Column 3, line 1, change "(9)" to --(A)--

Column 4, line 13, after "lower" insert --clamp--

Column 8, line 25, change "9A" to --9(A)--; and line 38, change "therefor" to --therefore--

Column 9, line 12, change "0(G)" to --10(G)--; and line 30, change "th" to --the--

UNITED STATES PATENT OFFICE
CERTIFICATE OF CORRECTION

Patent No. 4,063,061          Dated December 13, 1977

Inventor(s) Yoshiharu Fujino, et al

It is certified that error appears in the above-identified patent and that said Letters Patent are hereby corrected as shown below:

IN THE DRAWINGS

Figs. 1, 2, 3, 4, 7, 8(B), 9(A), 9(C), 9(E), 10(C), 10(L), 10(M) and 12(B) should be deleted and substituted with the attached corresponding figs. therefore.

The drawing fig. which appears on the cover sheet should be deleted to appear as per attached FIG. 2.

Signed and Sealed this

Twentieth Day of February 1979

[SEAL]

Attest:

RUTH C. MASON
*Attesting Officer*

DONALD W. BANNER
*Commissioner of Patents and Trademarks*

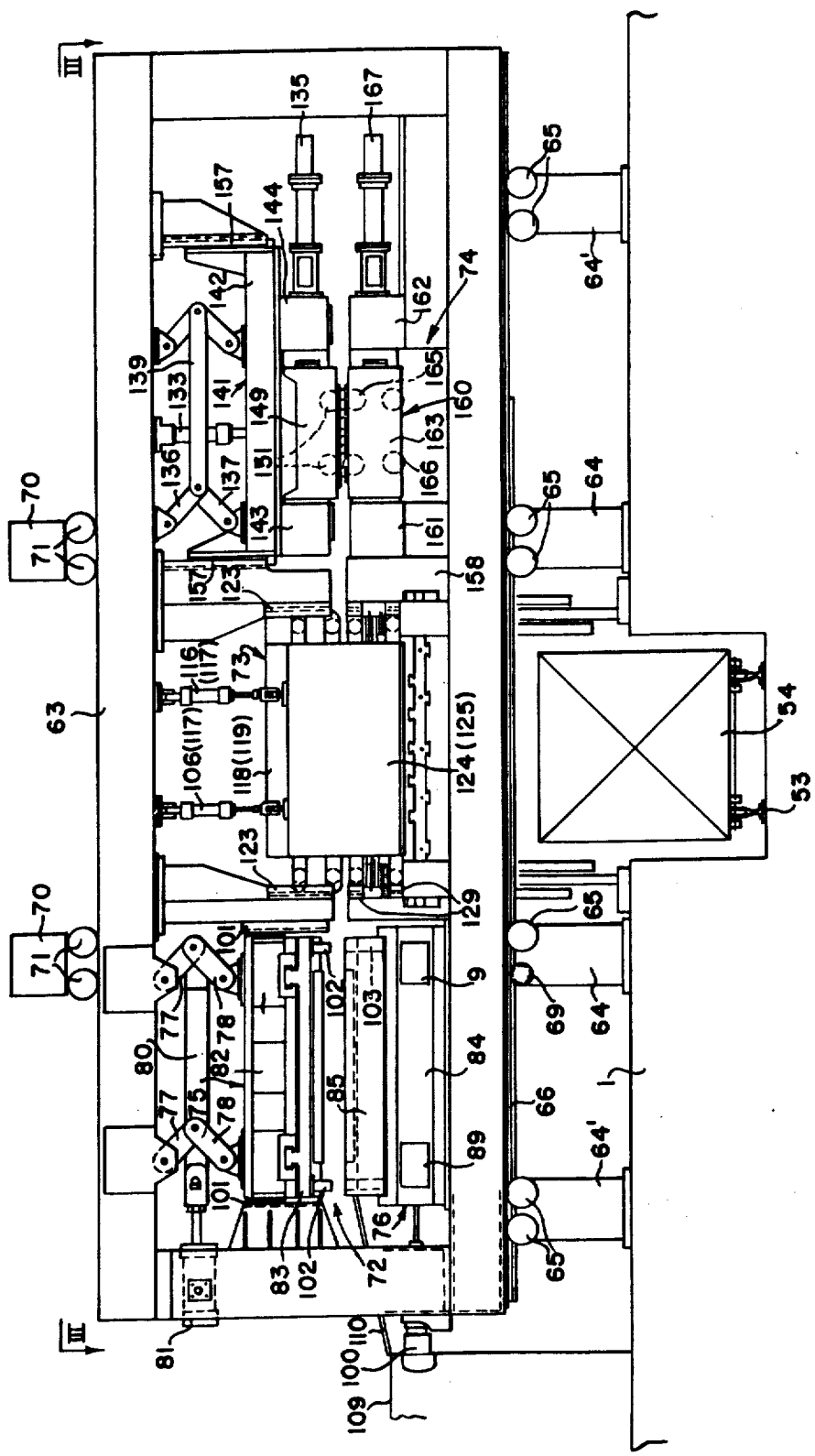

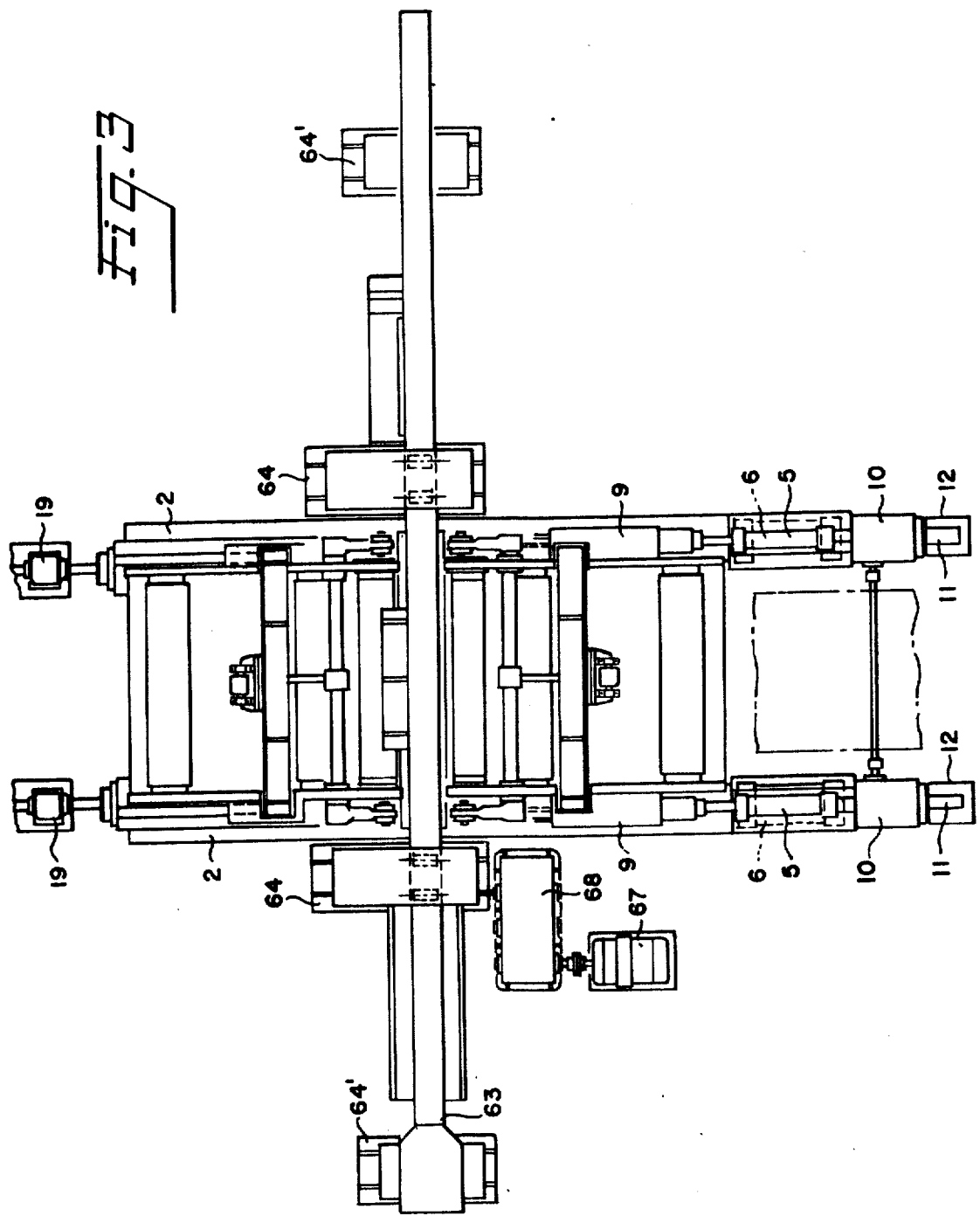

Fig. 7
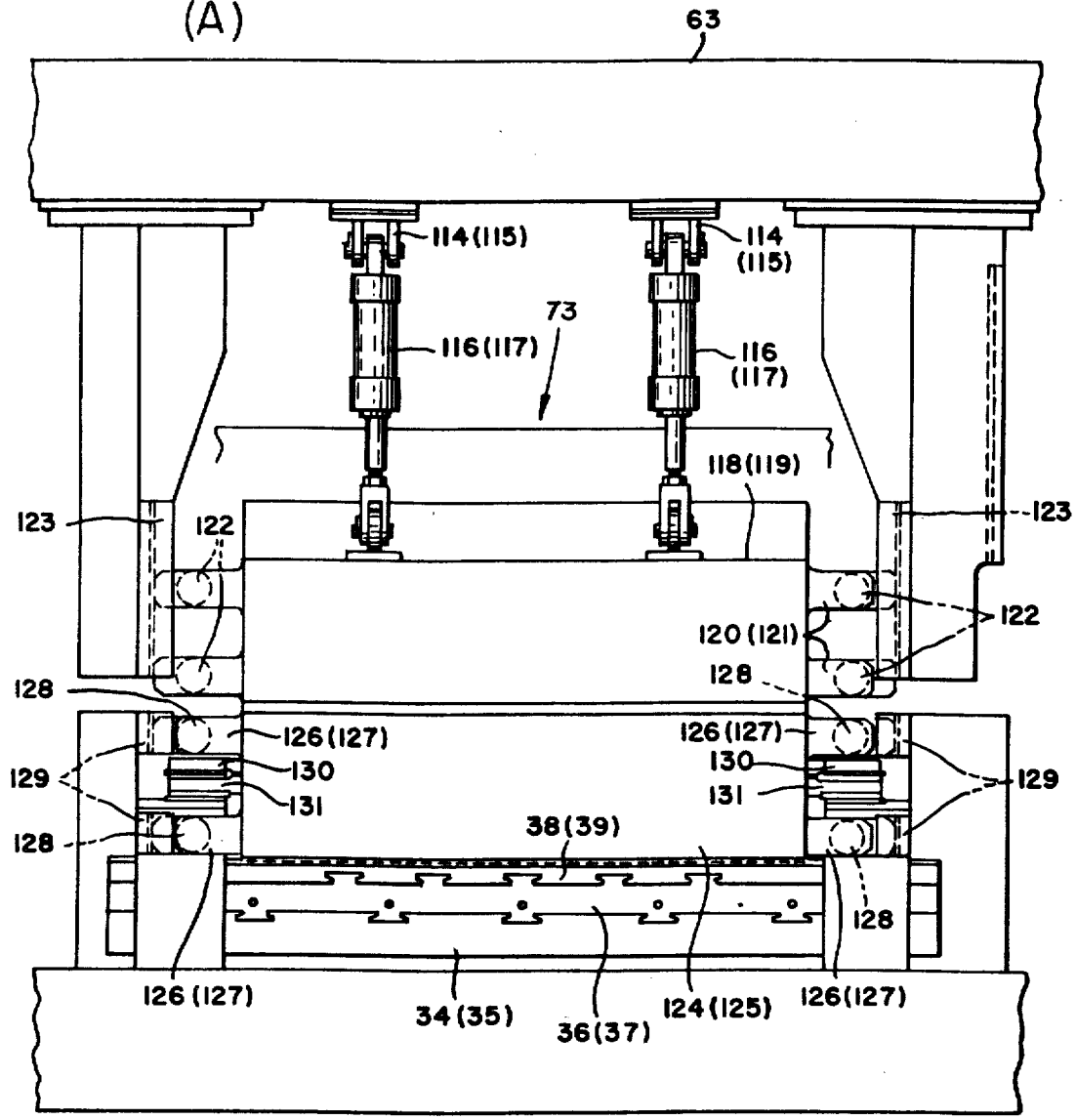
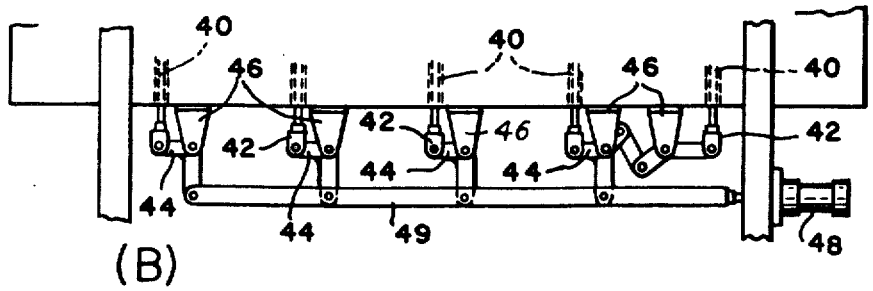

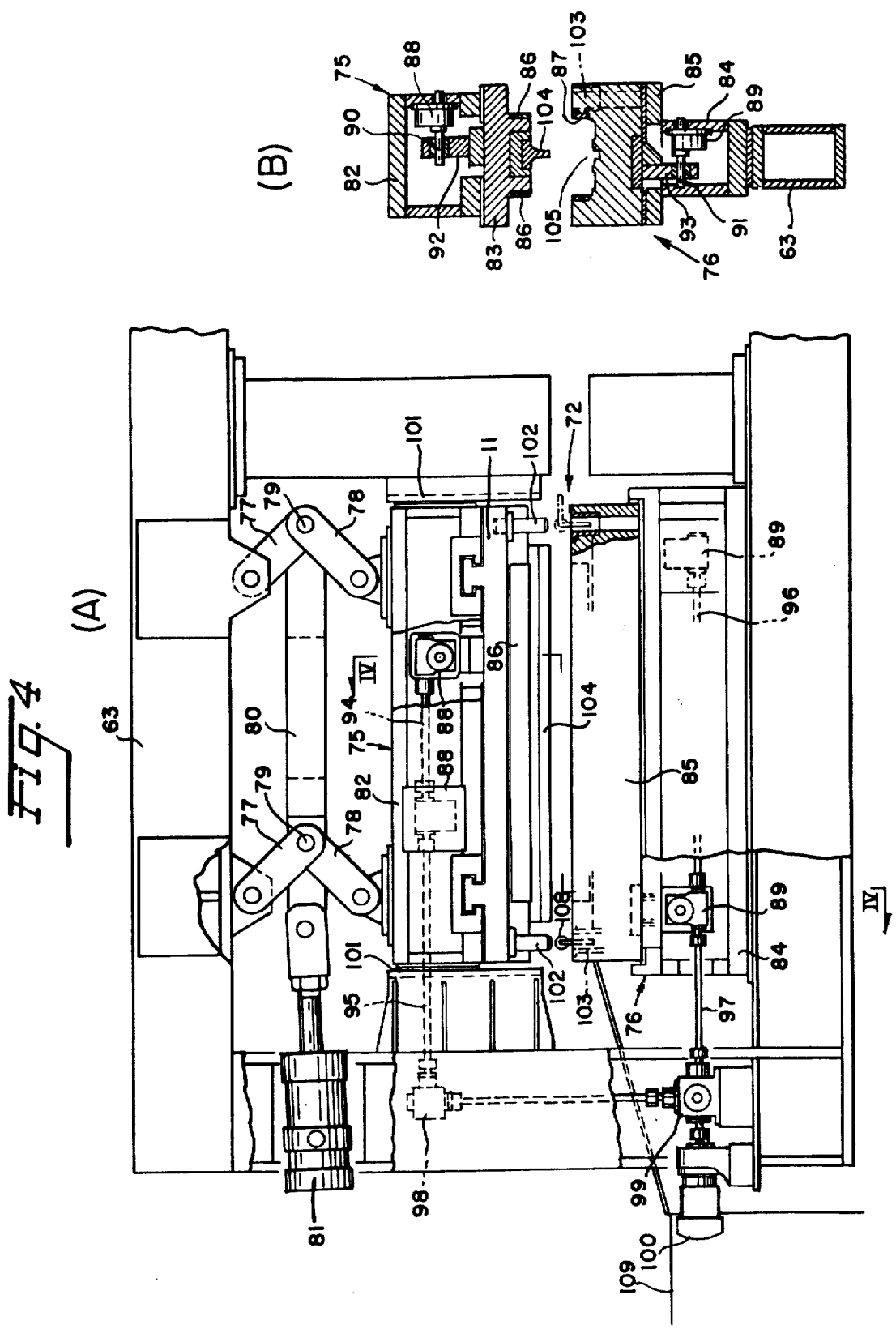

Figure 10:
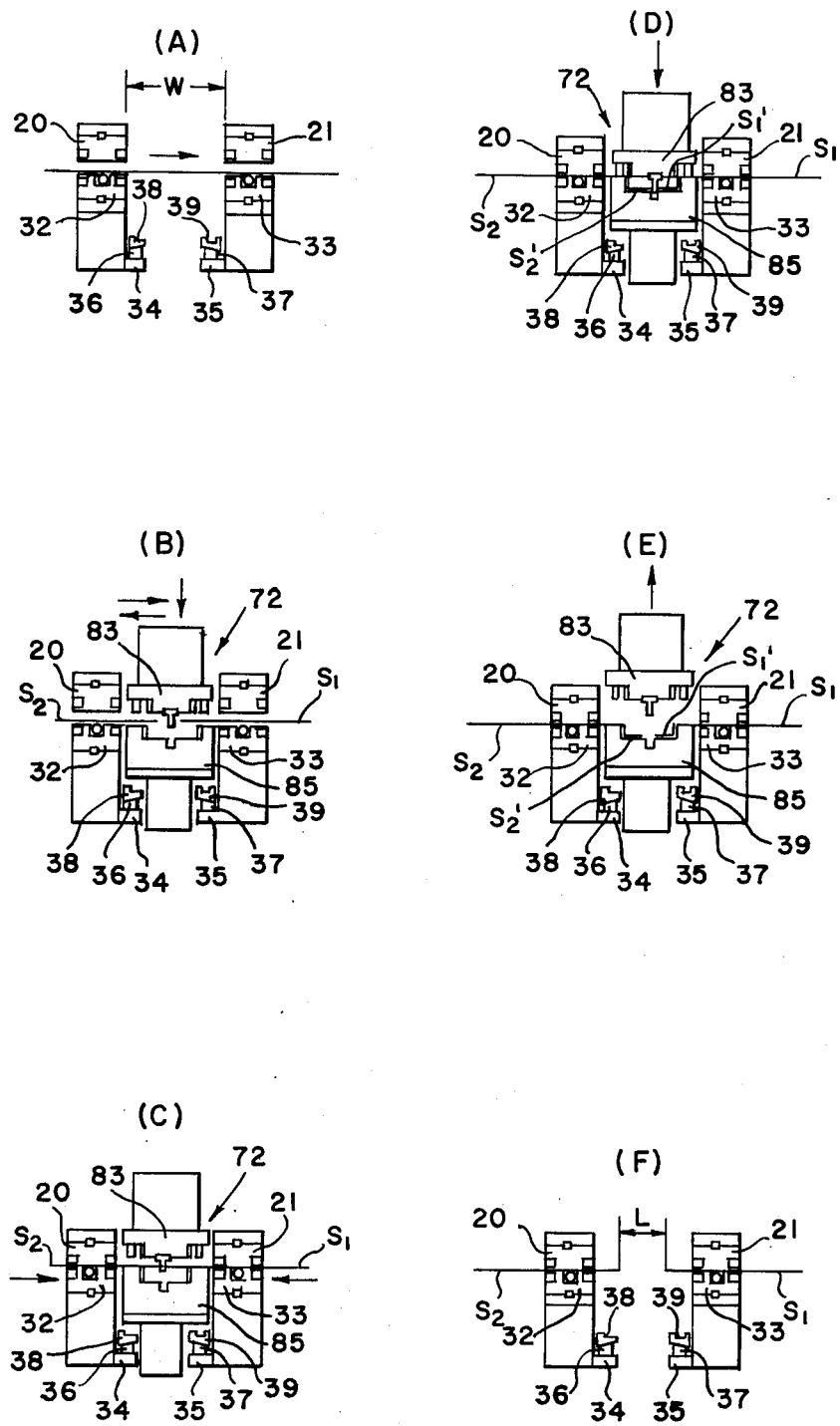

Fig.10
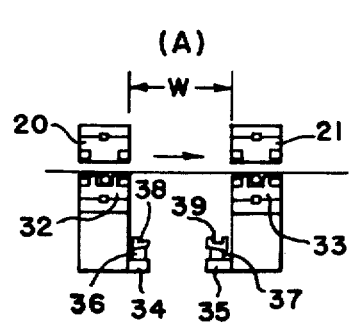
(A)
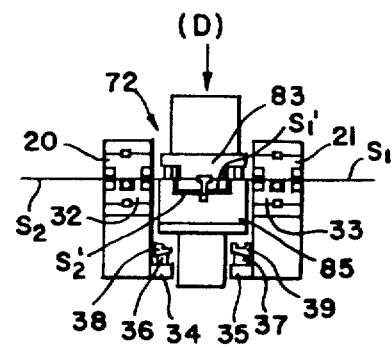
(D)
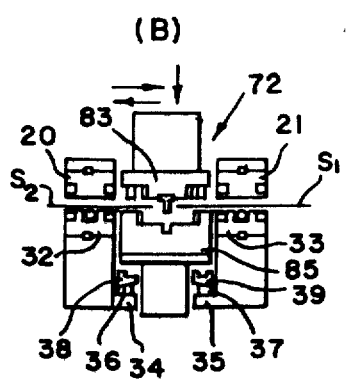
(B)
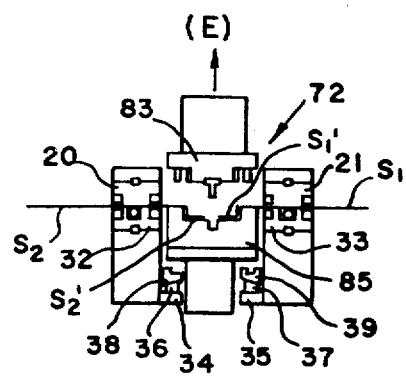
(E)
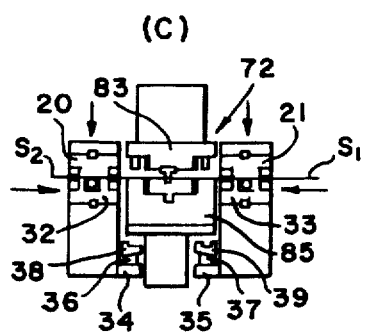
(C)
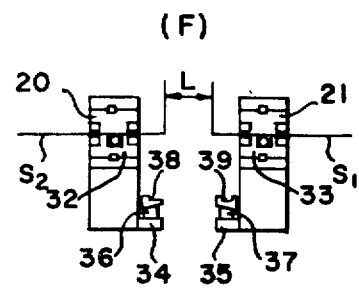
(F)

Fig.10
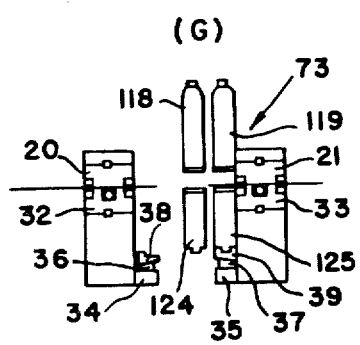
(G)
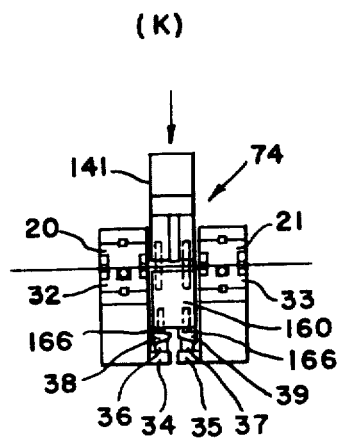
(K)
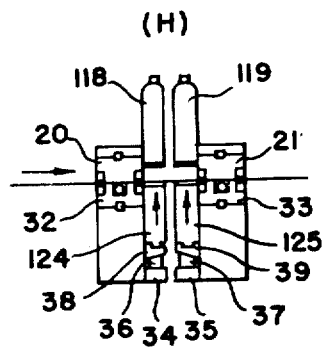
(H)
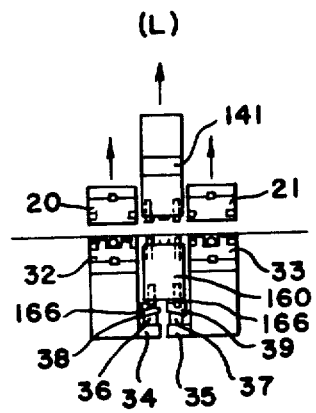
(L)
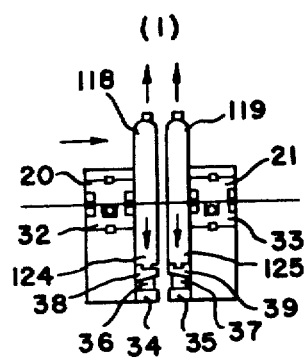
(I)
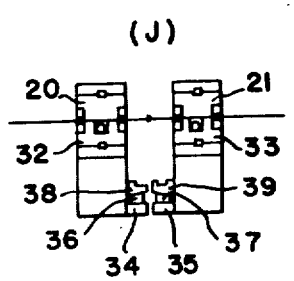
(J)
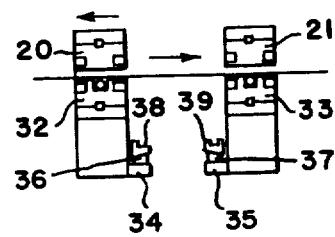
(M)